United States Patent
Stephenson et al.

(10) Patent No.: US 9,177,559 B2
(45) Date of Patent: Nov. 3, 2015

(54) METHOD AND APPARATUS FOR ANALYZING ANIMAL VOCALIZATIONS, EXTRACTING IDENTIFICATION CHARACTERISTICS, AND USING DATABASES OF THESE CHARACTERISTICS FOR IDENTIFYING THE SPECIES OF VOCALIZING ANIMALS

(71) Applicants: Tom Stephenson, Brooklyn, NY (US); Stephen Travis Pope, Santa Barbara, CA (US)

(72) Inventors: Tom Stephenson, Brooklyn, NY (US); Stephen Travis Pope, Santa Barbara, CA (US)

(*) Notice: Subject to any disclaimer, the term of this patent is extended or adjusted under 35 U.S.C. 154(b) by 207 days.

(21) Appl. No.: 13/841,926

(22) Filed: Mar. 15, 2013

(65) Prior Publication Data
US 2013/0282379 A1  Oct. 24, 2013

Related U.S. Application Data

(60) Provisional application No. 61/637,483, filed on Apr. 24, 2012.

(51) Int. Cl.
*G10L 17/00* (2013.01)
*G10L 17/26* (2013.01)
*G10L 25/48* (2013.01)
*G10L 25/18* (2013.01)

(52) U.S. Cl.
CPC ............ *G10L 17/26* (2013.01); *G10L 25/18* (2013.01); *G10L 25/48* (2013.01)

(58) Field of Classification Search
CPC .......................... G10L 17/26; A01K 1/006
See application file for complete search history.

(56) References Cited

U.S. PATENT DOCUMENTS

| | | | |
|---|---|---|---|
| 2005/0049876 A1* | 3/2005 | Agranat | 704/270 |
| 2008/0223307 A1* | 9/2008 | Patton | 119/712 |
| 2011/0213612 A1* | 9/2011 | Zakarauskas | 704/233 |

* cited by examiner

*Primary Examiner* — Daniel Abebe
(74) *Attorney, Agent, or Firm* — Stein IP, LLC

(57) ABSTRACT

A method for capturing and analyzing audio, in particular vocalizing animals, which uses the resulting analysis parameters to establish a database of identification characteristics for the vocalizations of known species. This database can then be compared against the parameters of unknown species to identify the species producing that vocalization type. The method uses a unique multi-stage method of analysis that includes first-stage analysis followed by segmentation of a vocalization into its structural components, such as Parts, Elements, and Sections. Further analysis of the individual Parts, Elements, Sections and other song structures produces a wide range of parameters which are then used to assign to a collection of identical, known species a diagnostic set of criteria. Subsequently, the vocalizations of unknown species can be similarly analyzed and the resulting parameters can be used to match the unknown data sample to the database of samples from a plurality of known species.

48 Claims, 30 Drawing Sheets

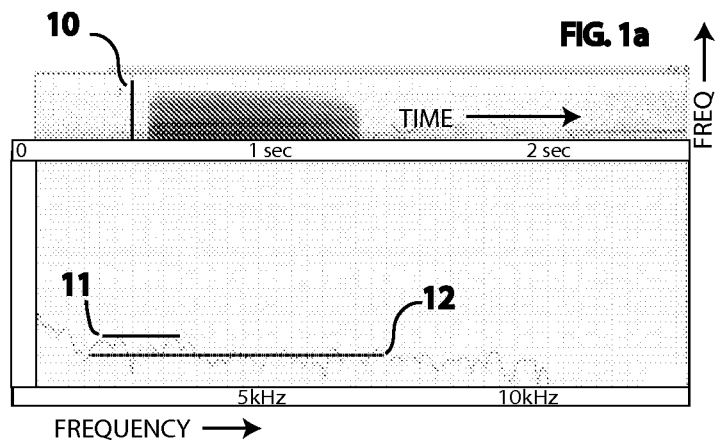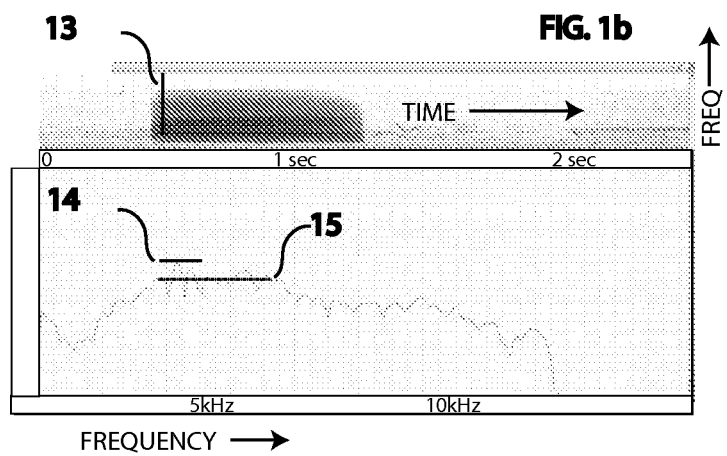

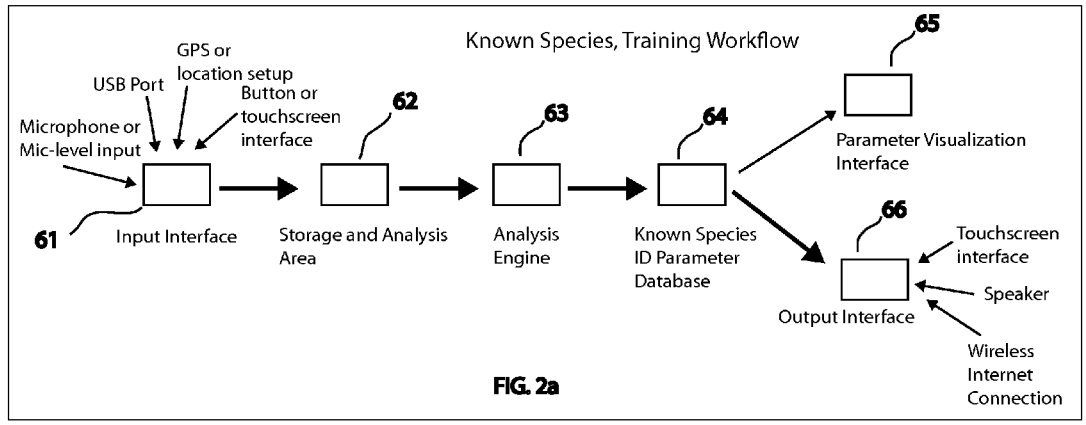
FIG. 2a
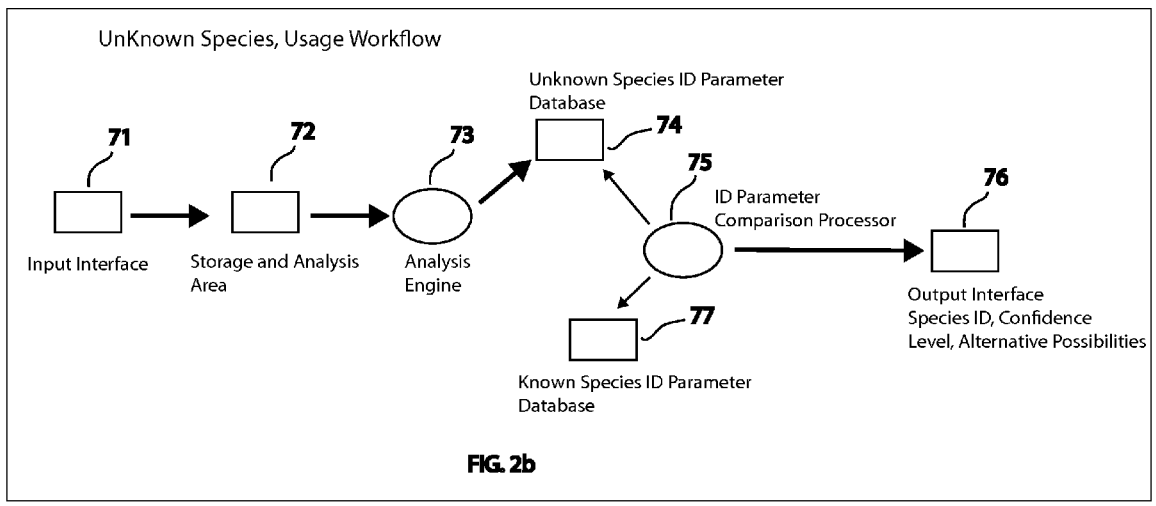
FIG. 2b
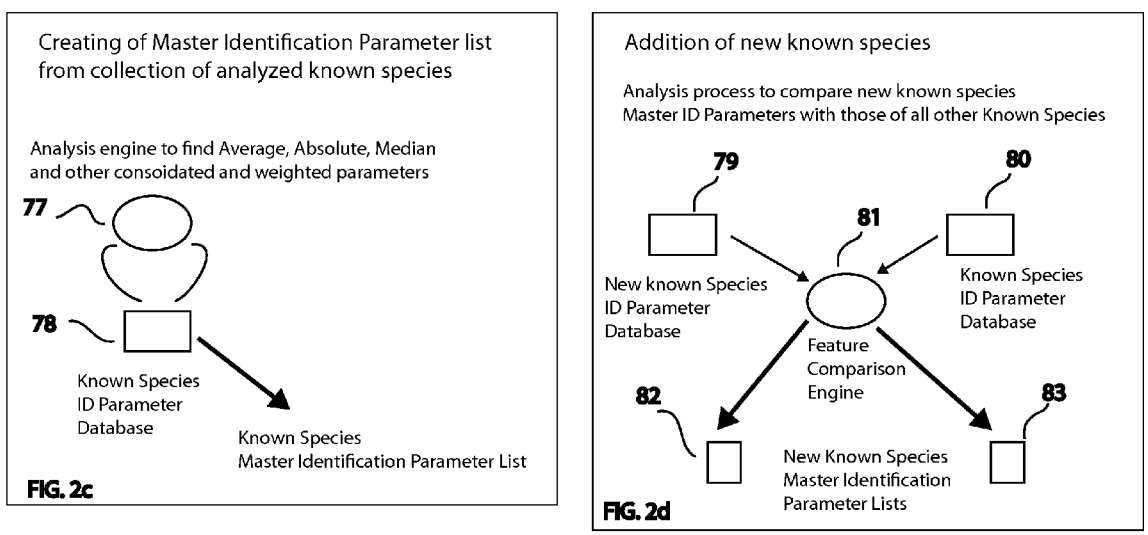
FIG. 2c
FIG. 2d

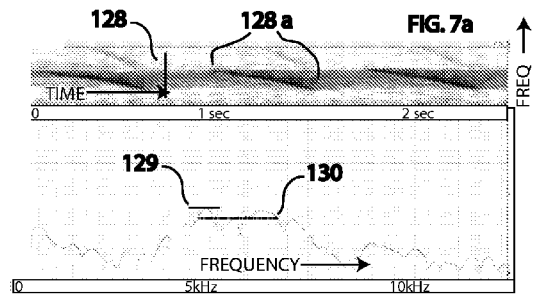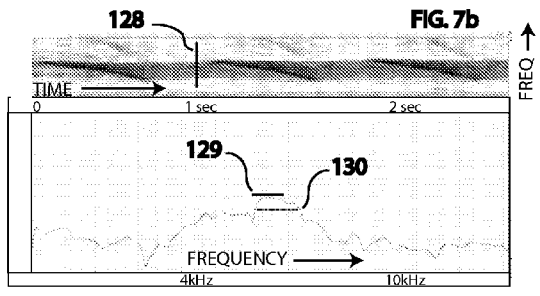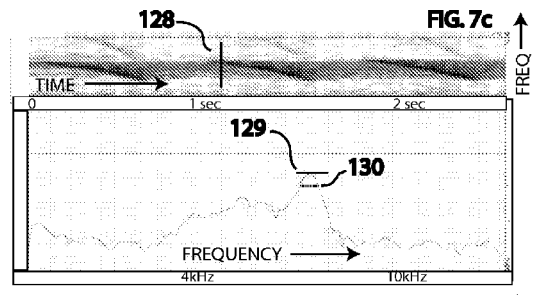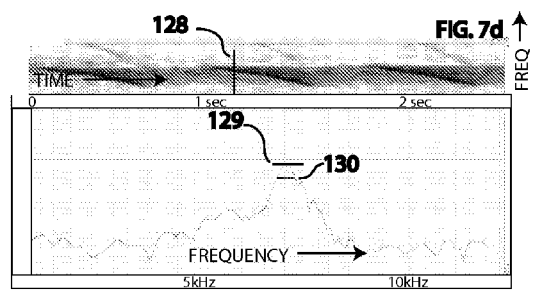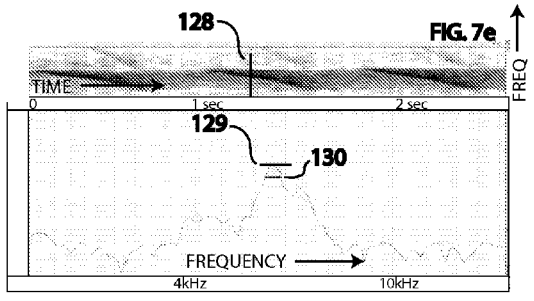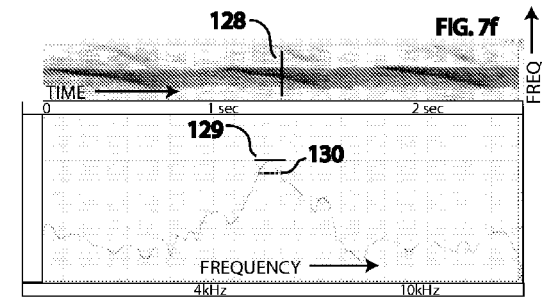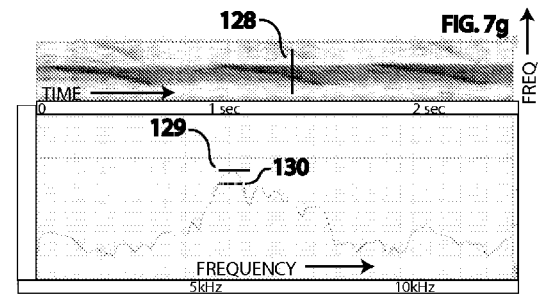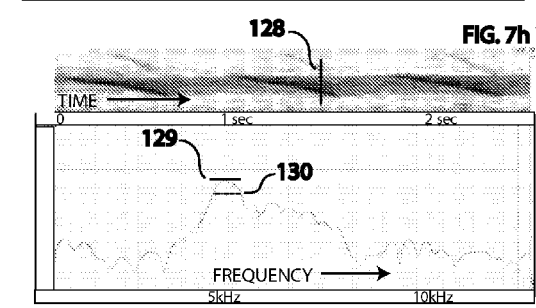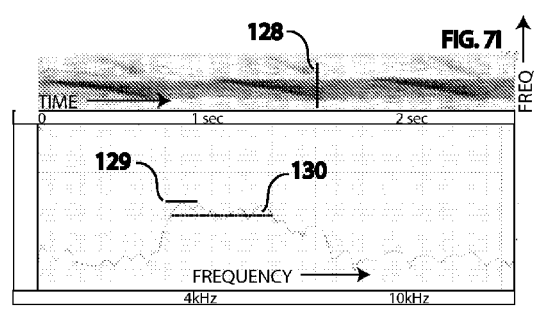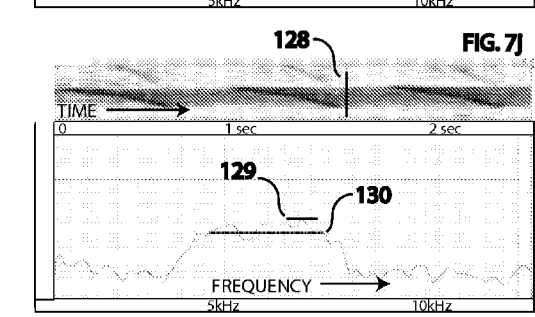

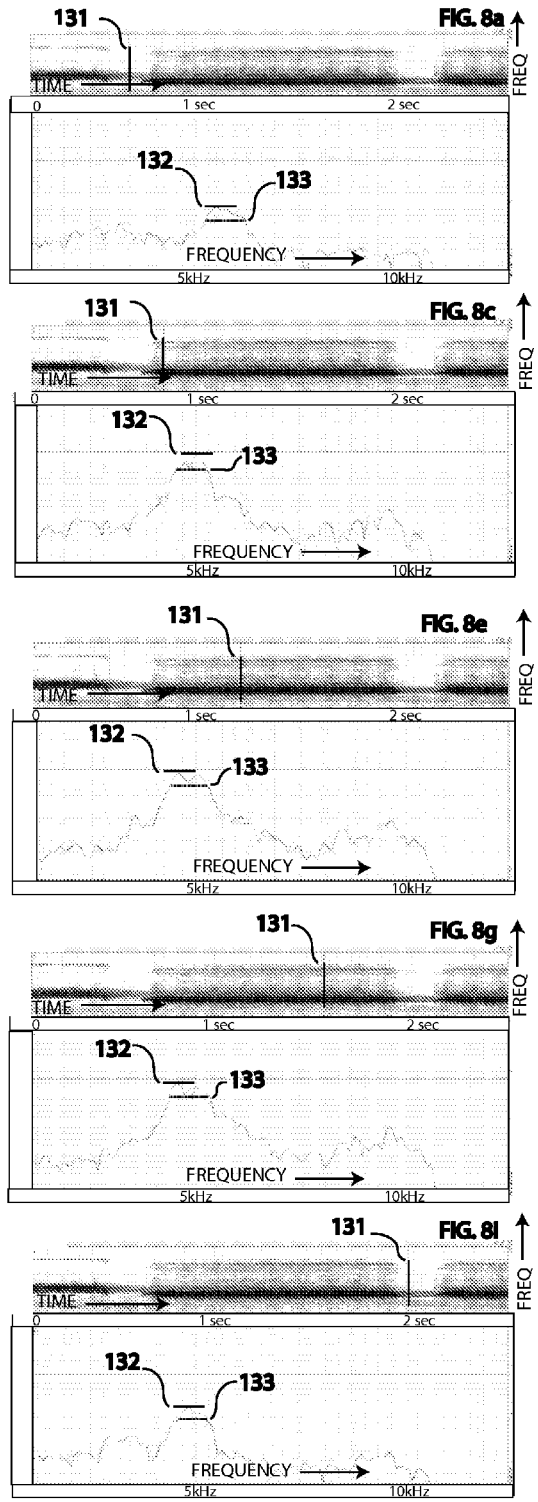
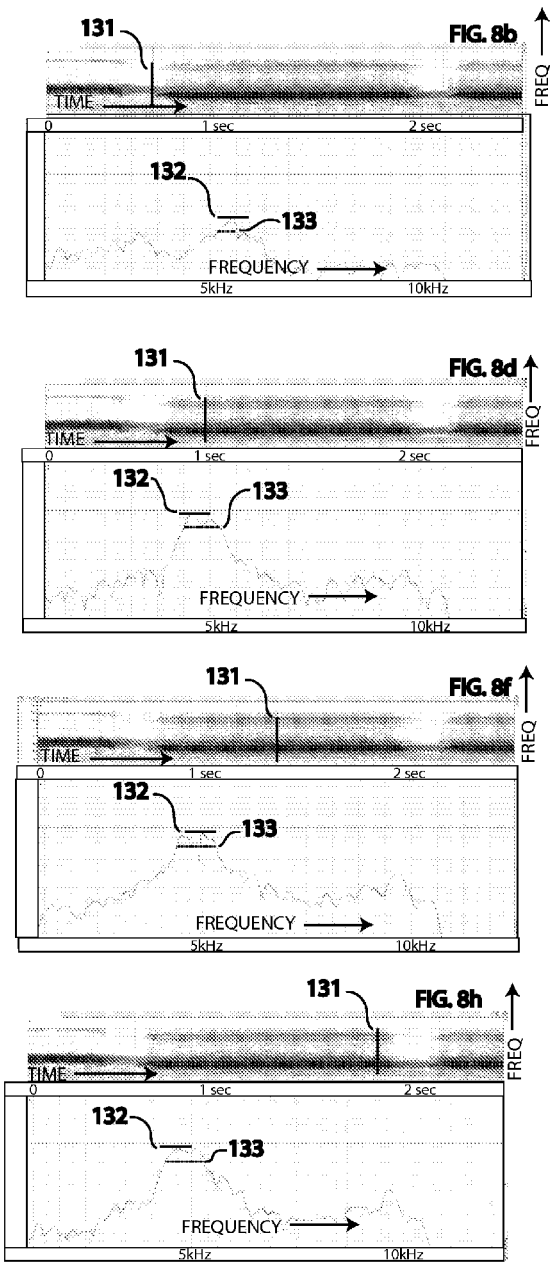

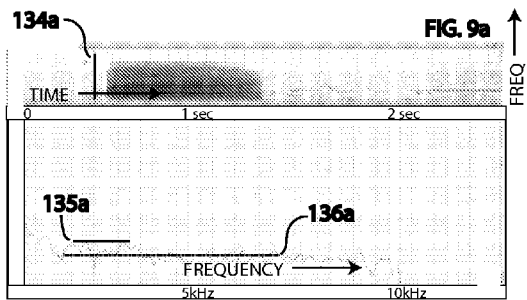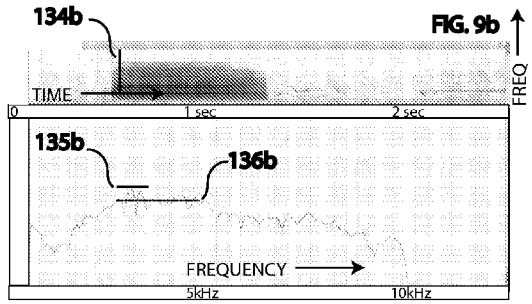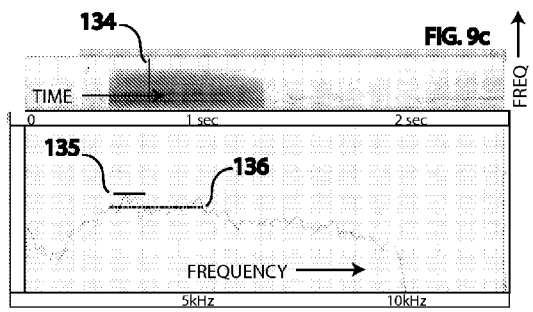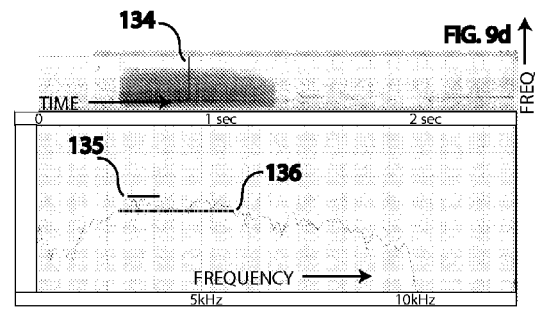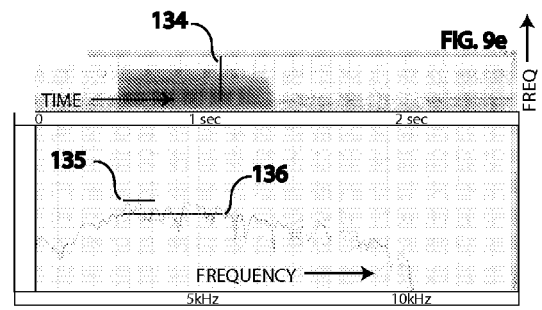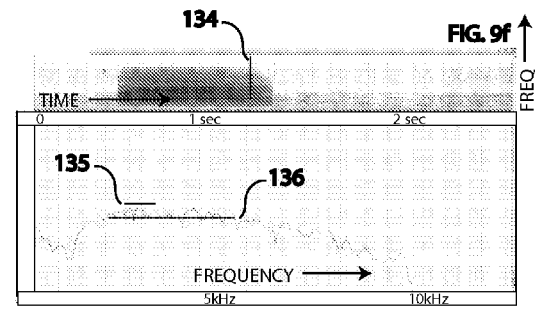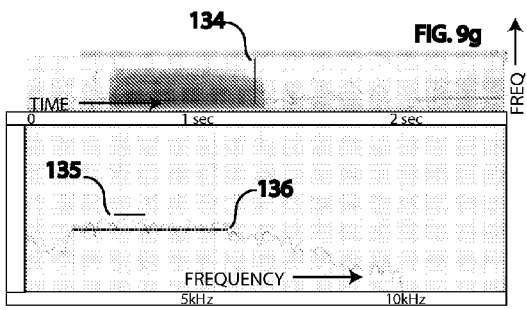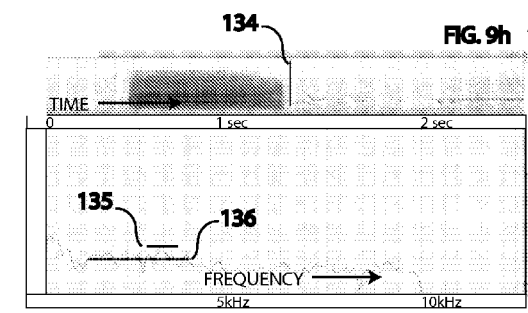

Clear Part

Buzz Part

Noise Part

Complex Parts

Element start and end points

Element Length

Number of Elements in phrase

Element pitch profile

Element rhythm profile

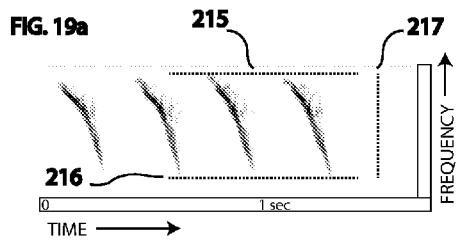
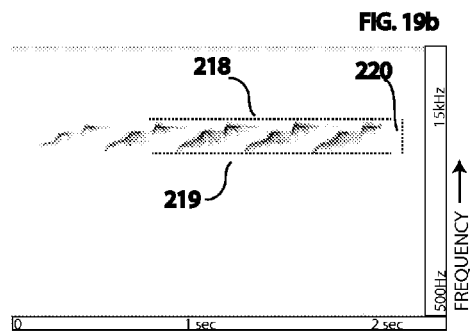
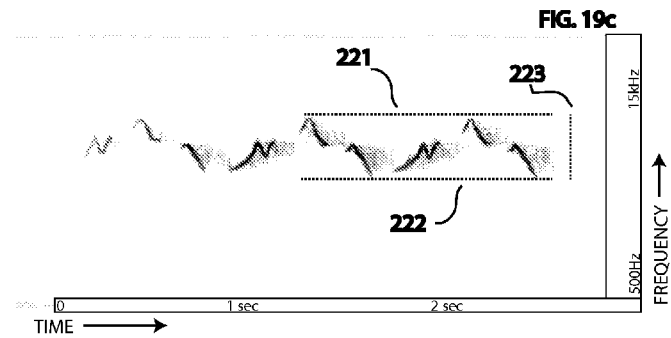
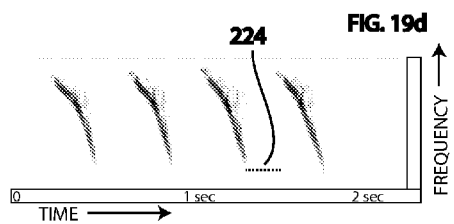
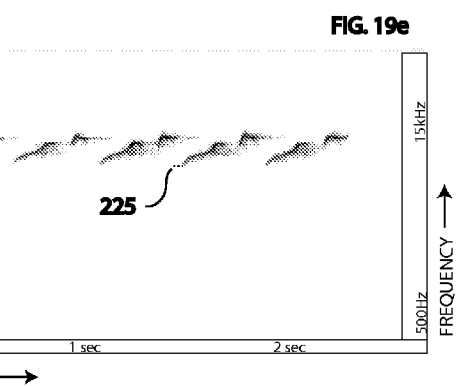
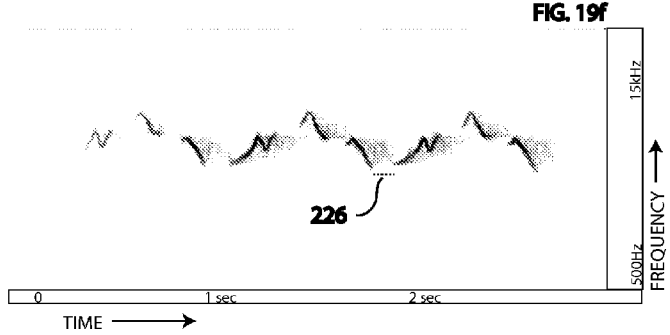

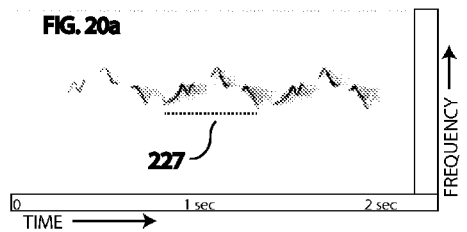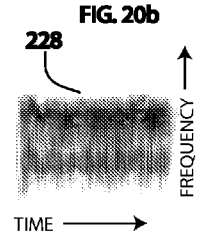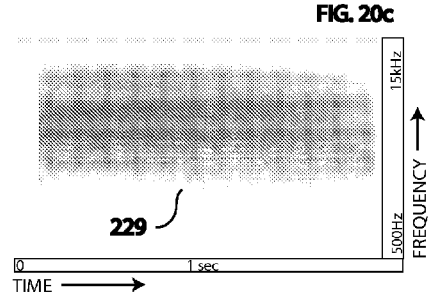
Element quality
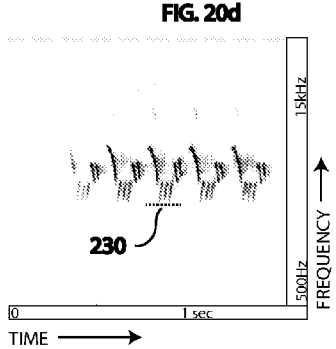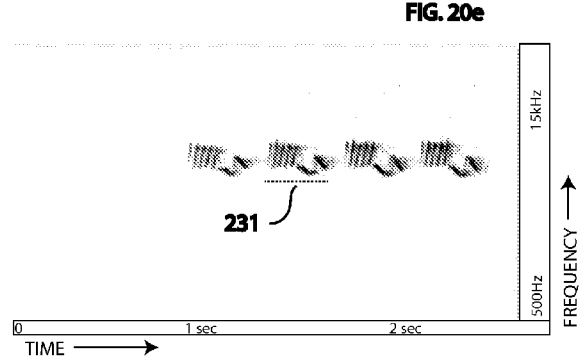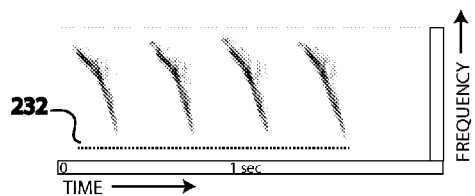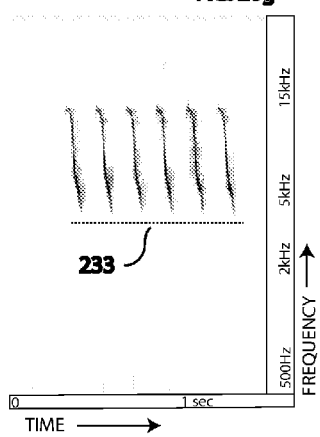

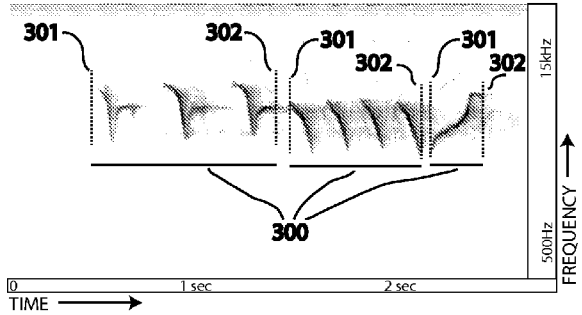
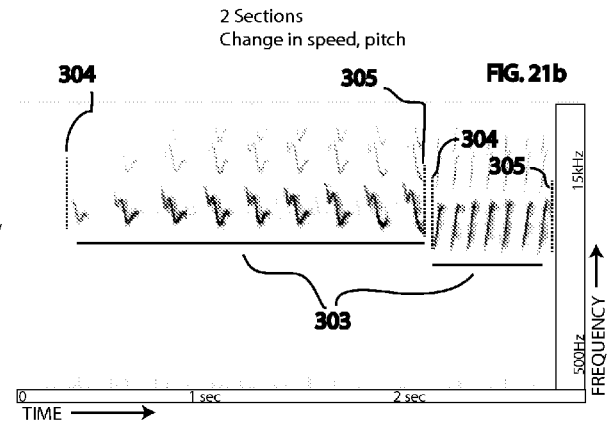
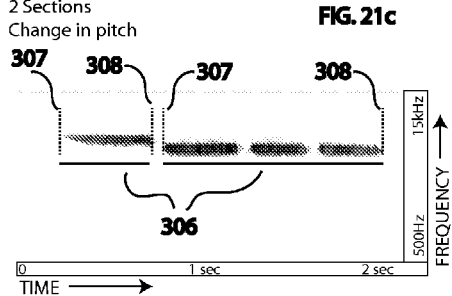
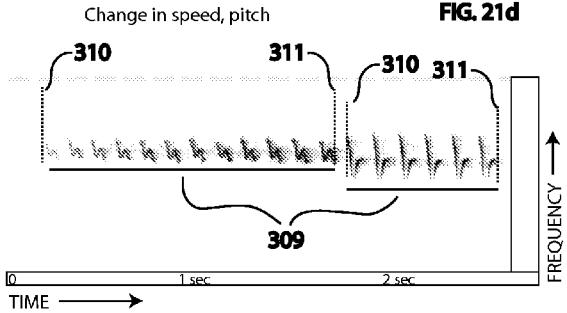
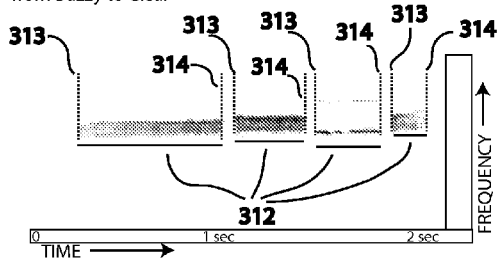
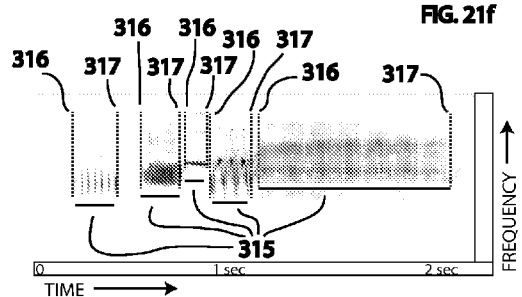
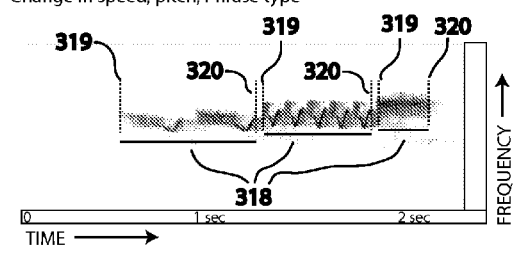

Section pitch high, low, span

Number of Elements in sections

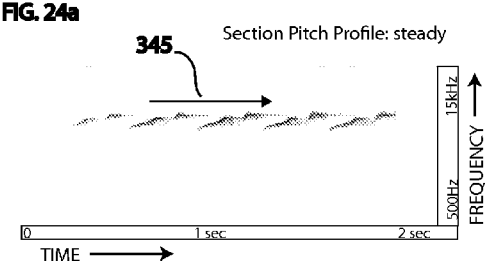
FIG. 24a — Section Pitch Profile: steady
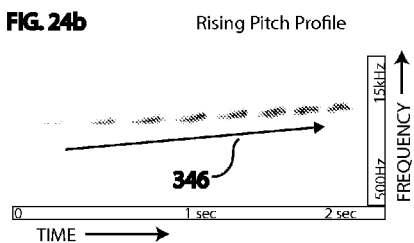
FIG. 24b — Rising Pitch Profile
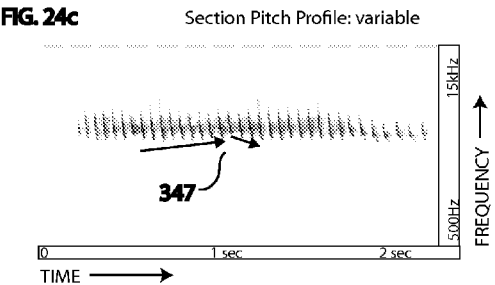
FIG. 24c — Section Pitch Profile: variable
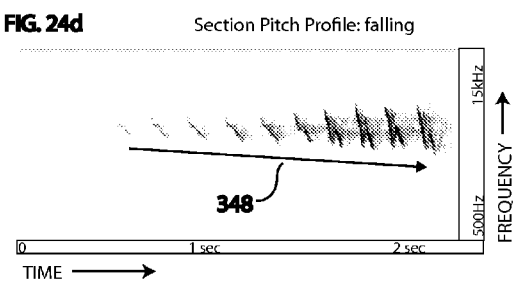
FIG. 24d — Section Pitch Profile: falling
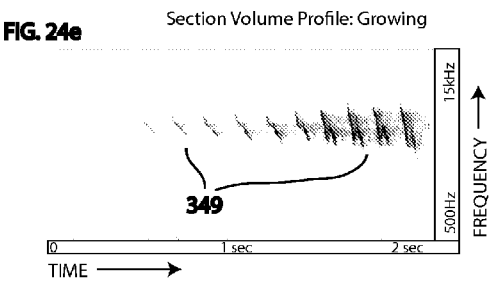
FIG. 24e — Section Volume Profile: Growing
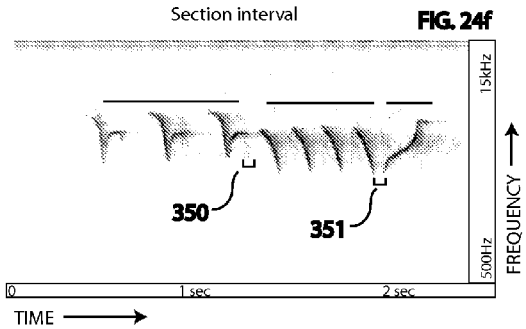
FIG. 24f — Section interval
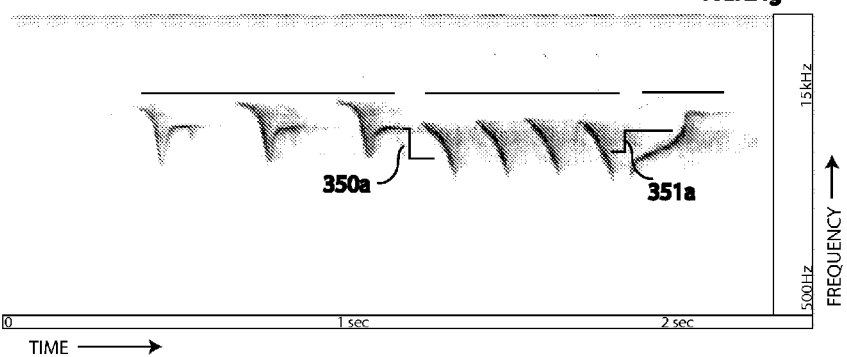
FIG. 24g — Section Pitch Interval

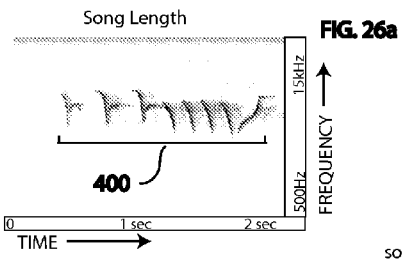
FIG. 26a
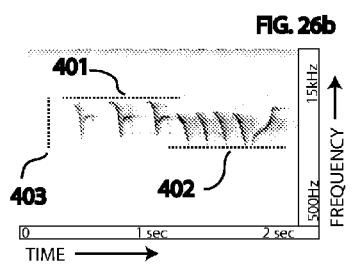
FIG. 26b
song high and low freq and span
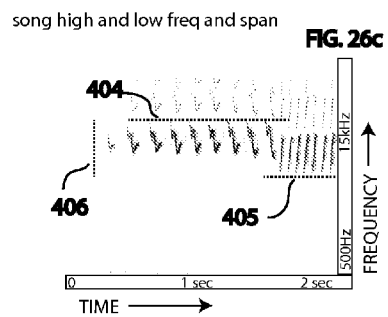
FIG. 26c
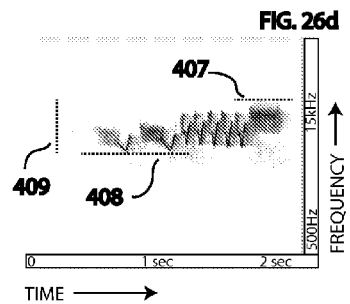
FIG. 26d
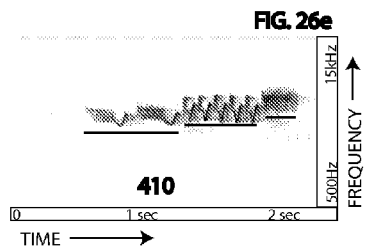
FIG. 26e
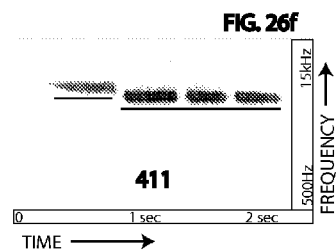
FIG. 26f
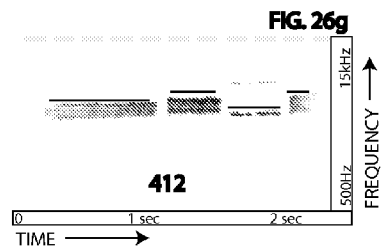
FIG. 26g
Song Pitch Profile: Rising FIG. 26h
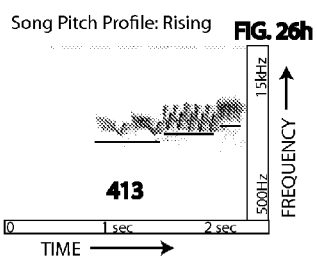
Song Pitch Profile: Falling FIG. 26i
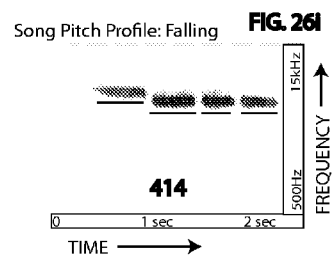
Song Pitch Profile: Variable FIG. 26j
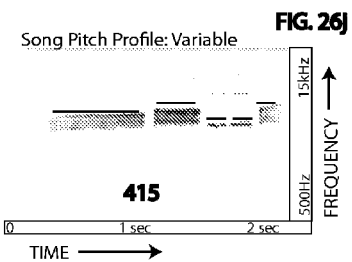
Song Rhythm Profile: Speeds Up FIG. 26k
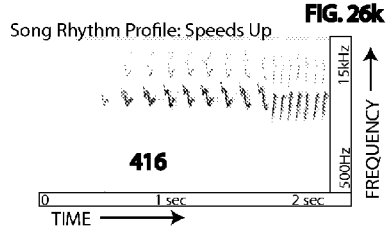
Song Rhythm Profile: Variable FIG. 26l
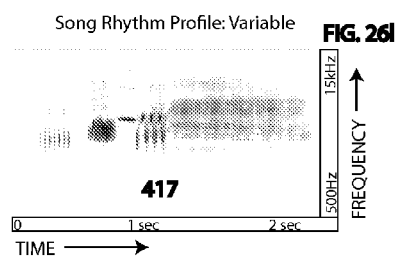

B1: Black-throated thr Green Warbler

| ANALYZED SONGS | TOTAL SECTION NUMBER | SOSong LEnLength (sc)(Sec.) | ovOverall pitPitch Low (Hz) | ovOverall pitPitch high (Hz) | SECTION 1 LENGTH | SECTION 1 # PHRASES | ELEMENT # | SECTION 2 LENGTH | SECTION 2 # PHRASES | ELEMENT # | SECTION 3 LENGTH | SECTION 3 # PHRASES | ELEMENT # | SECTION 4 LENGTH | SECTION 3 # PHRASES | ELEMENT # |
|---|---|---|---|---|---|---|---|---|---|---|---|---|---|---|---|---|
| C21 | 3 | 1.4 | 3500 | 7000 | 0.8 | 7 | 1 | 0.1 | 1 | 1 | 0.3 | 1 | 1 | | | |
| C23 | 3 | 1.4 | 3500 | 7000 | 0.8 | 7 | 1 | 0.1 | 1 | 1 | 0.3 | 1 | 1 | | | |
| PW1 | 3 | 1.5 | 4500 | 7000 | 1.1 | 5 | 1 | 0.2 | 1 | 1 | 0.2 | 1 | 1 | | | |
| PE3 | 3 | 1.6 | 3800 | 7500 | 1.1 | 7 | 1 | 0.3 | 1 | 1 | 0.3 | 1 | 1 | | | |
| C22 | 3 | 1.2 | 3900 | 7450 | 0.7 | 6 | 1 | 0.2 | 1 | 1 | 0.3 | 1 | 1 | | | |
| C12 | 3 | 1.6 | 3500 | 7000 | 1.0 | 4 | 1 | 0.2 | 1 | 1 | 0.3 | 1 | 1 | | | |
| C13 | 3 | 1.4 | 3300 | 7100 | 0.8 | 3 | 1 | 0.2 | 1 | 1 | 0.3 | 1 | 1 | | | |
| PW2 | 3 | 1.6 | 3500 | 7200 | 1.1 | 4 | 1 | 0.2 | 1 | 1 | 0.2 | 1 | 1 | | | |
| C11 | 3 | 1.3 | 3600 | 7150 | 0.8 | 3 | 1 | 0.2 | 1 | 1 | 0.2 | 1 | 1 | | | |
| SE1 | 3 | 1.5 | 3500 | 7150 | 0.9 | 5 | 1 | 0.2 | 1 | 1 | 0.2 | 1 | 1 | | | |
| SE3 | 3 | 1.5 | 3400 | 7200 | 1.0 | 5 | 1 | 0.2 | 1 | 1 | 0.2 | 1 | 1 | | | |
| C31 | 4 | 1.9 | 3500 | 7000 | 0.6 | 1 | 1 | 0.3 | 1 | 1 | 0.3 | 2 | 1 | 0.2 | 1 | 1 |
| C32 | 4 | 1.9 | 3500 | 7000 | 0.6 | 1 | 1 | 0.3 | 1 | 1 | 0.3 | 2 | 1 | 0.2 | 1 | 1 |
| PE1 | 4 | 1.8 | 4000 | 7500 | 0.6 | 1 | 1 | 0.3 | 1 | 1 | 0.4 | 2 | 1 | 0.2 | 1 | 1 |
| PE2 | 4 | 1.8 | 4000 | 7500 | 0.6 | 1 | 1 | 0.3 | 1 | 1 | 0.4 | 2 | 1 | 0.2 | 1 | 1 |
| C42 | 4 | 1.9 | 3700 | 7400 | 0.6 | 1 | 1 | 0.4 | 1 | 1 | 0.4 | 2 | 1 | 0.2 | 1 | 1 |
| C43 | 4 | 1.9 | 3500 | 7350 | 0.6 | 1 | 1 | 0.4 | 1 | 1 | 0.4 | 2 | 1 | 0.2 | 1 | 1 |
| PW3 | 4 | 1.8 | 3500 | 7200 | 0.6 | 1 | 1 | 0.4 | 1 | 1 | 0.4 | 2 | 1 | 0.2 | 1 | 1 |
| C41 | 4 | 1.8 | 3400 | 7100 | 0.6 | 1 | 1 | 0.4 | 1 | 1 | 0.3 | 2 | 1 | 0.2 | 1 | 1 |
| SE4 | 4 | 1.4 | 3600 | 7200 | 0.4 | 1 | 1 | 0.3 | 1 | 1 | 0.5 | 2 | 1 | 0.2 | 1 | 1 |
| Average | | 1.61 | 3635 | 7205 | 0.765 | 3.25 | | 0.26 | | | 0.31 | | | | | |
| Max | | 1.9 | 4500 | 7500 | 0.4 | | | | | | | | | | | |
| Min | | 1.2 | 3300 | 7000 | 1.1 | | | | | | | | | | | |
| Avg. 3-Sect Song | | | | | 0.9 | 5.1 | 1.0 | 0.2 | 1.0 | 1.0 | 0.3 | 1.0 | 1.0 | | | |
| Avg. 4-Sect Song | | | | | 0.6 | 1.0 | 1.0 | 0.3 | 1.0 | 1.0 | 0.4 | 2.0 | 1.0 | 0.2 | 1.0 | 1.0 |

| | |
|---|---|
| RANGE | East Mississippi River |
| TIME IN US | March 22-October 15 |
| SONG QUAL | Always Partly Buzz |
| SONG PITCH | Always Variable |
| SECTION # | Never <3, never >4 |
| PHRASE TYPE | Always 1-Element Phrases all Sections |

FIG. 29

UNKNOWN SPECIES IDENTIFICATION PROCESS

| UNKNOWN SPECIES PARAMETERS | | POSSIBLE CANDIDATE SPECIES IN KNOWN SPECIES DATABASE | |
|---|---|---|---|
| | | 250 | |
| Song Location | → New York State | 175 | 75 not in NY State |
| Song Date | → May 15 | 137 | 38 not in NY State this date |
| Song Type/Quality | → Structured; Buzz | 65 | 72 Other types/qualities: clear, etc. |
| Song Pitch Profile | → Falling | 16 | 49 Rising, Variable, Steady |
| Section Count | → 2 | 11 | 5 1 or 3+ Section Songs |
| Song Length | → 1.1 seconds | 9 | 2 Always longer than 1.5 secs. |
| 1st Section Element Type | → 2-Part | 6 | 3 1st Section 1- or 3+- Part Elements |
| 2nd Section Element Type | → 1-Part | 6 | 0 All others 1-Part Elements 2nd Section |
| 2nd Section Speed | → Trill | 3 | 3 Countable speed in 2nd Section |
| 1st Section High Freq. | → 8,300 Hz | 1 | 2 Highest frequency 6,000 Hz or lower |

FIG. 30

METHOD AND APPARATUS FOR ANALYZING ANIMAL VOCALIZATIONS, EXTRACTING IDENTIFICATION CHARACTERISTICS, AND USING DATABASES OF THESE CHARACTERISTICS FOR IDENTIFYING THE SPECIES OF VOCALIZING ANIMALS

CROSS-REFERENCE TO RELATED APPLICATIONS

This application claims the benefit of U.S. Provisional Application No. 61/637,483, filed Apr. 24, 2012, in the U.S. Patent and Trademark Office, the disclosure of which is incorporated herein by reference.

BACKGROUND OF THE INVENTION

1. Field of the Invention

This invention relates to the field of audio analysis and the identification of animal species based on their vocalizations.

2. Description of the Related Art

Many people want to identify unknown singing birds and other animals. From families with backyard bird feeders to beginning and even experienced bird watchers, knowing the identity of a singing bird is a goal shared by many.

Most animal species have characteristic vocalizations that make identifying the species possible. An example of this is bird songs or frog croaks, which vary much more between species than within a species. If one were able to make a "sonic dictionary" of the typical vocalizations of a number of species, one could build a computer "expert system" to identify species based solely on their vocalizations.

Current technology for bird song identification consists of transliterations in printed field guides with personalized use of vowels and consonants, for example using a phrase like "tseet tseet tseeo" to try and replicate the sound of a particular species so that another person could use these to match the vocalization of an unknown species.

All computer programs and applications for mobile devices designed to help identify a vocalizing animal only present prior recordings of various species, leaving it to the end user to play through potentially many files and attempt to match one file to the unknown vocalization.

Therefore, a system and method which can quickly narrow the search through these recording files to a few or one species, based on a new and unknown vocalization, is desired.

SUMMARY OF THE INVENTION

The system of analysis of an aspect of the invention uses objective structural and qualitative characteristics to define the key identifying characteristics of known species. These characteristics are then stored in a database and can be compared subsequently to the extracted characteristics of an unknown species. The comparison can be done directly by an end user or by a computer or an engine designed to work in a mobile electronic device or other devices.

Rather than using traditional transliterations this system uses repeatable, objective criteria that can be extracted from a vocalization by an analysis engine. Some of these criteria can also be heard and utilized by a human, as outlined in *The Warbler Guide* by Tom Stephenson (Princeton University Press 2013).

These criteria include identifying the Parts, Elements and Sections that make up the structural organization of the overall vocalization. Further defined qualities are assigned to each Part as well as lower level amplitude, time and frequency characteristics. Higher level qualities are attributed to the overall vocalization as well.

All of these parameters are stored in a database as Identification Parameters for that particular example for that species. A large number of samples of each species are analyzed and the resulting parameters are subject to further analysis to determine the average and absolute ranges of all of the parameters, creating the Master Identification Parameters for that species.

An unknown file or vocalization can then be analyzed and the resulting parameters can be compared, using various heuristic criteria, to the database of known species. Based on this comparison, an identity can be presented. The system also can provide a confidence level, based on the number of matched criteria, and can also present other possible candidates with their probability or confidence level.

While not limited thereto, an embodiment of the invention is directed to a method comprising capturing the sound of the animal's vocalization onto a digital device as sampled digital audio data; performing signal analysis on the sampled digital audio data to extract a plurality of features that describe the low-level time-domain and frequency-domain properties of the sampled digital audio data; using the extracted analysis features to perform audio onset detection and/or segmentation to determine the break-points in time that describe the individual notes, chirps, or time-segments of the vocalization ("Parts") captured in the sampled digital audio data; creating a summary of the plurality of extracted features for each Part that characterize its course-grained time-domain and frequency-domain properties; performing further data reduction to reduce this plurality of extracted analysis features to a subset that best characterizes the collection of Parts in the sampled digital audio data; using the subset of extracted analysis features to identify a match within a collection of similar extracted analysis features derived from vocalizations of a plurality of animals of a plurality of known species; and storing or reporting the results of the match in the form of the names of one or more species of animals that the method has identified as potential sources of the vocalization captured in the sampled digital audio data.

According to an aspect of the invention, this method may be embodied in an apparatus, which may comprise a recording device; a processing unit configured to execute the method using the data recorded by the recording device; and a digital storage unit configured to store the data recorded by the recording device and the output of the processing unit.

According to an aspect of the invention, the method may alternatively be embodied in a system for identifying the species, appearance or other characteristics of an animal based on its vocalizations, the system comprising a recording device; a networking interface connected to the recording device; and a storage and processing unit configured to execute the method, which is accessed over a wide-area or local-area computer network through the networking interface.

According to an aspect of the invention, the method may be encoded as processing instructions on a computer readable medium and implemented using one or more processors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1a-1b show examples of how the volume and other parameters of a Part differ from the surrounding silence or lower-volume ambience.

FIGS. 2a-2d show the signal flow for the known-species workflow (in the training phase: FIG. 2a), and for the unknown-species workflow (usage phase: FIG. 2b) of the analysis, segmentation and identification processing, as well as the processes for adding new known species (FIG. 2c) and the creation of the master identification parameters (FIG. 2d).

FIGS. 7a-7j demonstrate Part detection methods for Clear Parts.

FIGS. 8a-8i demonstrate Part detection methods for Buzz Parts.

FIGS. 9a-9h demonstrates Part detection methods for Noise Parts.

FIGS. 19a-19f present several examples of Element parameters including Element pitch spans, frequency spans, and intervals between Elements.

FIGS. 20a-20g demonstrate some of the variety of Element qualities in bird songs.

FIGS. 21a-21g show examples of groups of Sections and the Part and Element characteristics that create Sectional boundaries.

FIGS. 24a-24g present examples of various Section parameters including pitch profile, volume profile, and time and frequency interval from Section to Section.

FIGS. 26a-26l illustrate a range of song parameters including length, high and low frequencies and frequency span, and song pitch and rhythm profiles.

FIG. 29 is a spreadsheet that gives typical values for a collection of characteristic parameters for several songs of the same species, and the compiled Master Identification Parameters for that species.

FIG. 30 illustrates one possible identification process that might be used in the identification of a vocalization of an unknown species by comparing its prioritized identification parameters with those of all other known species.

DETAILED DESCRIPTION OF THE EMBODIMENTS

Figure 3A:
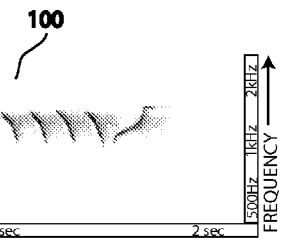
FIG. 3a shows a representation of a recorded vocalization using an audio spectrogram.

Reference will now be made in detail to the present embodiments of the present invention, examples of which are illustrated in the accompanying drawings, wherein like reference numerals refer to the like Elements throughout. The embodiments are described below in order to explain the present invention by referring to the figures.

Aspects of the invention comprise a method for the collection of a plurality of parameters from the characteristic vocalizations of a plurality of known species of animals, and an apparatus for executing this method. The parameters for each species are subject to a method of signal analysis and data reduction, reducing the plurality of parameters to the subset that best characterizes that species and that can be used to separate it from all other analyzed known species An unknown species can then be analyzed, using the same analysis and data reduction method, and the resulting parameters are then compared with the parameters from the known species database and an identity can be assigned. If only some of the parameters can be matched, then a confidence level can be assigned to the identified species, based on the range and priority of the matching parameters. FIG. 2a and FIG. 2b illustrate the basic block diagram of the invention for these two phases of operation.

The parameters of a plurality of songs of one known species are subject to an analysis process whereby the average and maximum parameter ranges, location information and other parameters are prioritized and consolidated to create a Master Identification Parameter list. FIG. 2c is a block diagram of this process including 78, the database of all analyzed parameters from that species, and 77, the analysis engine that analyzes, summarizes and prioritizes the various parameters of that species.

Furthermore, when a new known species is introduced and analyzed, the resulting parameters are compared with those of the known species database. FIG. 2d is a block diagram of this process. The parameters of the new known species (79) are compared to those of all other known species (80) by an analysis process (81). If the parameters substantially overlap those of any known species, then new parameters are created that will render each of the overlapping species once again unique and separable from all others. The adjusted lists (82, 83) then become the new master identification parameter lists for those species.

1. Detailed Description of the Drawings

FIGS. 1a-1b illustrate how the volume of a loud time-segment or Part (one that will be selected for analysis) differs from the surrounding silence or lower-volume ambience. The upper plot in each figure shows the spectrogram of the same portion of a recorded sound. The horizontal axis is time (flowing from left to right) and the vertical axis is frequency (with lower frequencies at the bottom). The lower plot in each figure is the spectrum for a single point in time—the point in time that is indicated in the upper plot as (10) or (13), respectively. In FIG. 1a, the point in time selected as (10) is relatively silent, so the total energy displayed in the spectrum plotted in the lower plot is low, as indicated by levels (11)—the spectral peak—and (12)—the area surrounding that peak. In contrast, the plot in FIG. 1b shows a loud segment of the vocalization, as indicated by (13) in the upper plot, and both the peak level (14) and its surrounding region (15) are both louder and better differentiated from the rest of the spectrum.

FIGS. 2a and 2d show the signal flow for the known-species workflow (i.e., the training phase of the system), and the unknown-species workflow (user phase) for the analysis, segmentation and identification processing stages. In both cases the left-most box (61 or 71) represents the data input sources, from which the system acquires the digital audio data (a stream of audio samples) to be analyzed, as well as related metadata such as the date, time and location of the recording. The input stage may be controlled by an interactive user interface. This digital audio data and its associated metadata are stored in an intermediate buffer (62 and 72) while being analyzed and processed. The signal analysis and feature extraction is performed by the analysis engine (63 and 73), which breaks the digital audio data into a sequence of short "windows" and analyzes them to derive a standard set of features that describe the time-domain and frequency-domain properties of each signal window. This list of feature values for each window is called the feature vector, and is processed by the subsequent stages of the analysis engine (63 and 73)—the onset detector, the segmenter and the statistical processing of the features for each time-segment discovered by the segmenter. In its last stage, the analysis engine performs data reduction on the feature vectors for each time-segment to generate the higher-level segmentation—the grouping of time-segments into Parts, Elements and Sections—and then computes the final summary of the overall "shape" of the original vocalization, which is called the identification parameters. In the training workflow of FIG. 2a, this final summary of the features is then stored into the known species database (64), and displayed to the user via the various user interfaces (65 and 66). In the end-user workflow of FIG. 2b, when the system was presented with the vocalization of an unknown species, the summary of the input data is sent to the unknown species database (74), and then provided to the matching system (75), which consults the known species database (77, the same as 64 from the training workflow in FIG. 2a) in order to arrive at an estimate of the species that generated the original vocalization. This is then reported to the user via the output interface (76). FIG. 2c illustrates how the components are connected for the process of creating the Master Identification Parameter List; the analysis engine (77) updates the known species database (78) with the mean or average values of the salient features for each species to generate the Master Identification Parameter List. The evolutionary process of adding new species to the database is shown in FIG. 2d, in which the comparison engine (81) identifies distinguishing values for the parameters of a new species from the database (79) and the known species database (80) in order to create new Master Identification Parameter Lists (82 and 83) for the new species and possibly any previously known species with overlapping master identification parameters.

Figure 3B:
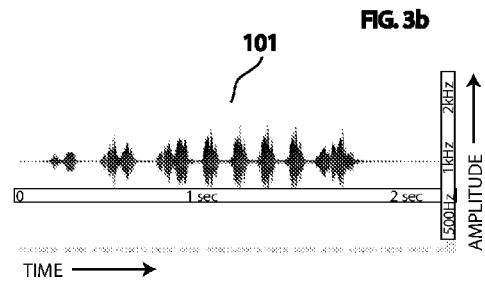
FIG. 3b shows a representation using an oscillogram.
Figure 3C:
FIG. 3c shows a possible user interface in the form of a slider-based interface.
Figure 3D:
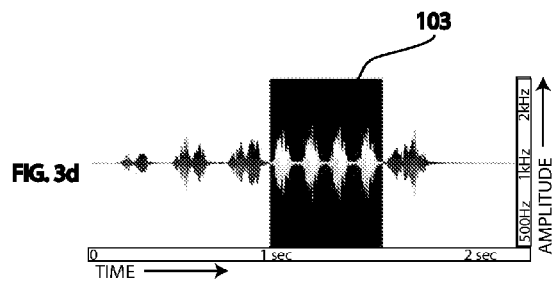
FIG. 3d shows a possible user interface involving a reverse contrast selection method.

FIGS. 3a and 3b demonstrate different representations of a recorded vocalization using an audio spectrogram (the time vs. frequency plot (100) of FIG. 3a) and an oscillogram (the time vs. amplitude plot (101) of FIG. 3b). The examples shown in FIG. 3c and FIG. 3d illustrate two possible user interfaces for selecting a region within an oscillogram, including a slider-based interface (102 in FIG. 3c), in this instance as an application on a mobile device, and a reverse contrast selection method (103 in FIG. 3d).

Figure 4A:
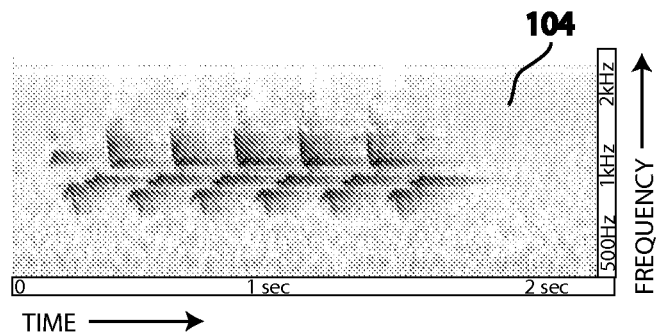
FIGS. 4a-4d are a set of spectrograms that illustrate noise or ambience reduction using spectral subtraction or brick wall filtering.
Figure 4B:
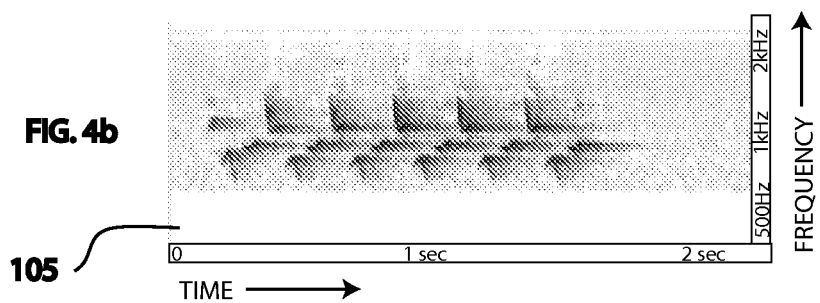
Figure 4C:
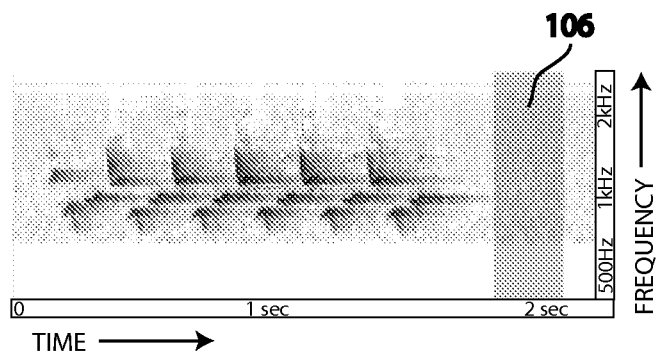

FIGS. 4a-4d are a sequence of spectrograms that illustrate the process of noise or ambience reduction using spectral subtraction or brick wall filtering. In FIG. 4a, a spectrogram is shown in which the gray areas (104) represent noise around the central dark region (the vocalization of interest). In FIG. 4b, a high-pass filter has been applied, so that the low frequencies (105) have been greatly attenuated. FIG. 4c demonstrates the selection of a region of relative silence, i.e., a segment where there is no signal of interest present (106). This can be used for a spectral subtraction process, the results of which are displayed in FIG. 4d, with region (107) showing the attenuated noise level everywhere except that around the vocalization of interest.

Figure 5:
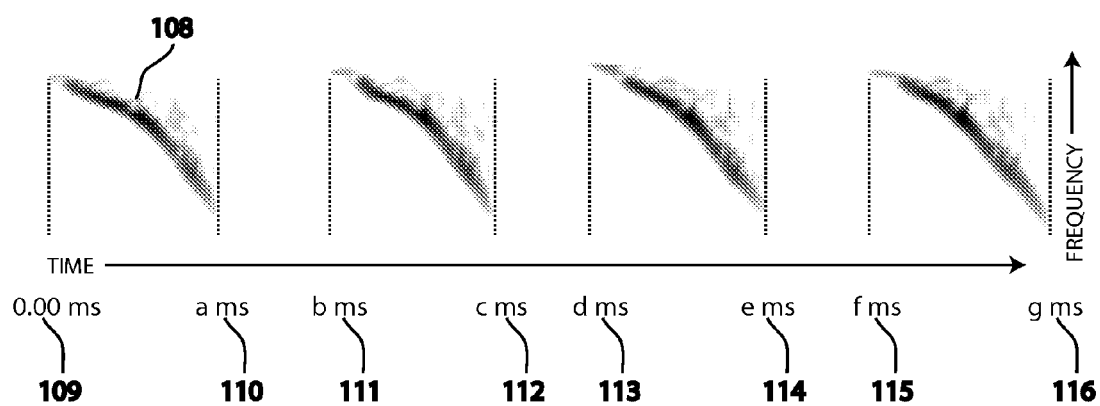
FIG. 5 shows an example of the time map of Parts within a single vocalization.

FIG. 5 is a time vs. frequency spectrogram plot of the time map of 4 time-segments or Parts (108 being the first) within a single vocalization. The time points (109, 111, 113 and 115) delineate the Part start-points whereas (110, 112, 114 and 116) indicate the stop-points of each time-segment or Part.

Figure 6A:
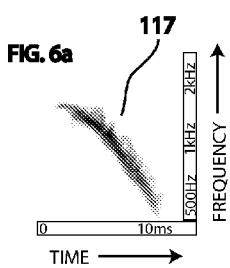
FIGS. 6a-6i give examples of different kinds of Parts, as well as Part parameters including length and interval between Parts.
Figure 6B:
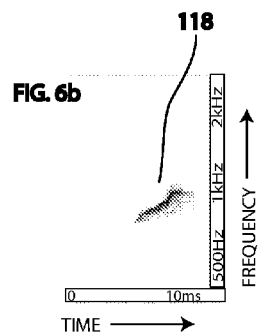
Figure 6C:
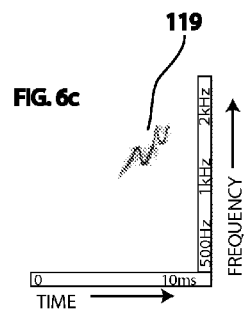
Figure 6D:
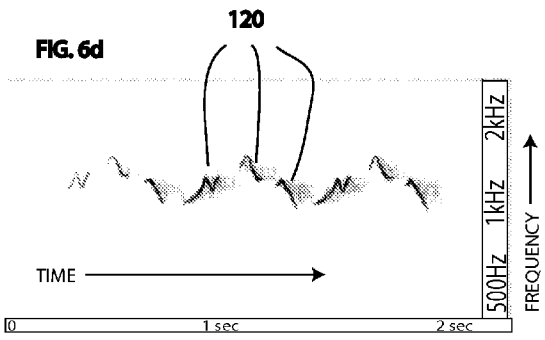
Figure 6E:
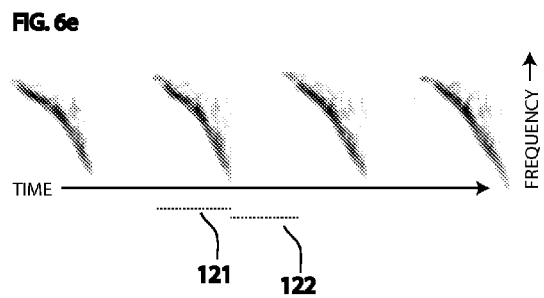
Figure 6F:
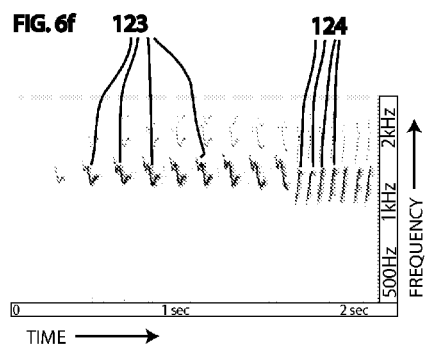
Figure 6G:
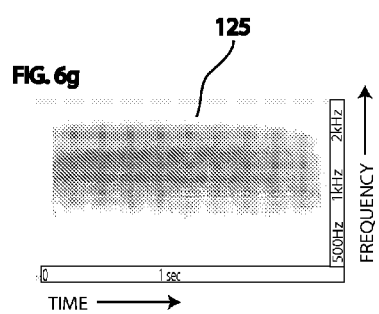
Figure 6H:
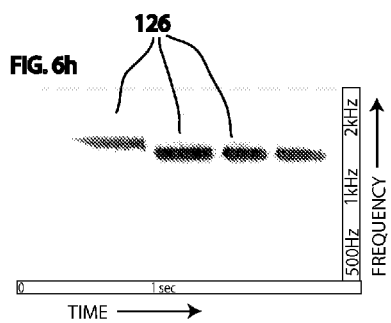
Figure 6I:
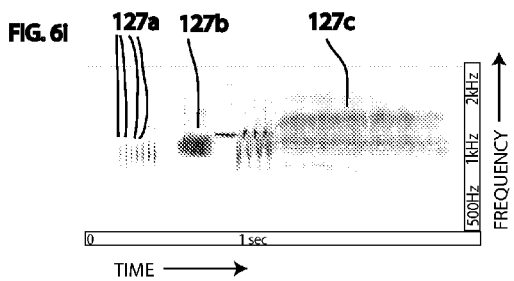

FIGS. 6a-6i give examples of the definition of time-segments or Parts, showing continuous events and segmentation. FIG. 6a shows the spectrogram of a Part with a distinct downward frequency trajectory (glissando) at (117), while the Part in FIG. 6b has a much less dramatic upward frequency trajectory (118). In FIG. 6c, the Element has a complex and nonlinear frequency evolution (119). The spectrogram in FIG. 6d shows 9 Parts, whereby the middle group (120) is identified to illustrate the repeating structure of the 3-Part Element. In FIG. 6e, the spectrogram shows a simpler repeating Section of similar Parts, with the parameters of Part duration (121) and inter-Part delay (122) identified. The song displayed in FIG. 6f has a more complex structure, with a sequence of complex downward glissandi (123) followed by a series of sharp upward glissandi (124). The spectrogram of FIG. 6g is an example of a noise Part (125). The song displayed in FIG. 6h has several distinct Parts, all examples of buzz quality Parts (126). FIG. 6i shows a very complex vocalization, with a combination of short Parts (127a), a buzz Part (127b) and a sustained buzz Part (127c).

The 2-Part plots in FIGS. 7a-7j demonstrate spectral Element detection methods for "clear" Parts, i.e., those that have a single spectral peak with low to moderate bandwidth. The upper plot in each figure shows the spectrogram of a portion of a recorded vocalization. The horizontal axis is time (flowing from left to right) and the vertical axis is frequency (with lower frequencies at the bottom). The lower plot in each figure is the spectrum for a single point in time—the point in time that is indicated in the upper plot as (128) or (128a, which points out one whole Part). In each of the lower plots, the spectral peak is identified by (129) and the region that determines the peak's bandwidth is shown as (130). Within the set of subfigures, the time-point of the spectral slice (128) progresses from left to right through the sound for FIG. 7a through FIG. 7j. In the best case, as in FIG. 7d or 7e, the spectral peak (129) is significantly higher than other of the other spectral regions, and its bandwidth (130) is narrow. This corresponds to the clarity of the dark spectral line visible in the upper plots at time-point (128) relative to the time-points for the plots before and after this.

FIGS. 8a-8i are similar to FIGS. 7a-7j, but show the spectral Element detection methods for "buzz" Parts, which commonly have 2 spectral peaks that are relatively close in frequency and amplitude. As before, the time-point for the spectral slice progresses through the sound from FIG. 8a through FIG. 8i. This dual-frequency "buzz" spectrum can be seen clearly in the upper spectrogram plots, e.g., in FIG. 8d at time (131), and also in the spectral slices, such as the peak levels and bandwidth shown as (131 and 133) in FIG. 8e or FIG. 8f.

FIGS. 9a-9h are also similar to FIGS. 7a-7j, but show the spectral Part detection methods for "noise" Parts, in which no clear spectral peaks can be detected. In all of the spectral slice plots of FIG. 9, no clear spectral peaks are visible (135), and the bandwidths of the relative peaks (136) are very wide.

Figure 10:
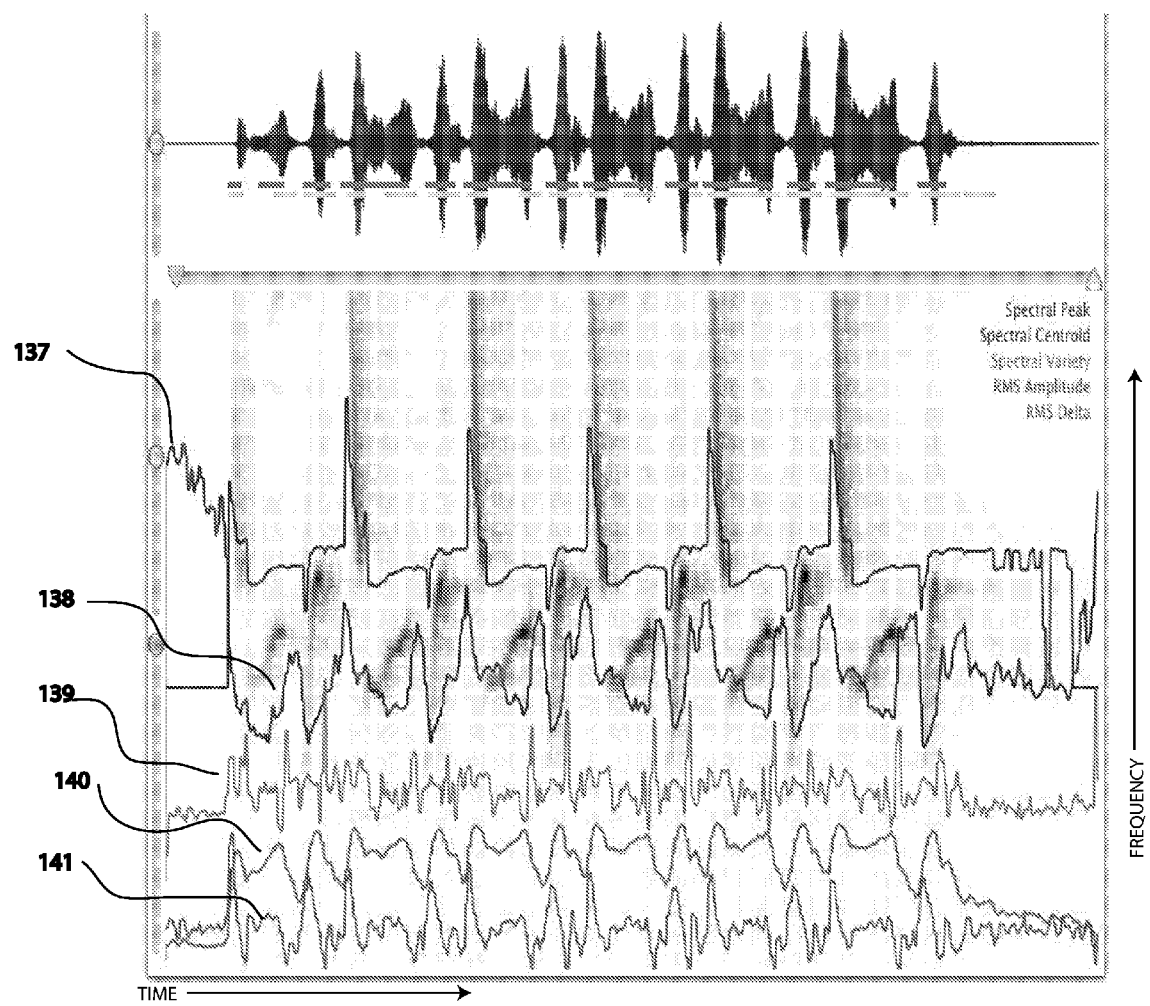
FIG. 10 shows a user interface with indication of several additional Part detection methods.

FIG. 10 displays an example of a user interface screen for vocalization analysis, with indication of several additional audio features that may be used as Part detection methods. The top plot is the oscillogram of a Section of digital audio data, with time vs. amplitude displayed. Below this is the spectrogram along the same time axis, with overlaid function plots showing the window-by-window values of extracted features for the spectral peak (137), the spectral centroid (138), the spectral variety (139), the RMS amplitude (140), and the window-to-window change in the RMS amplitude ("delta-RMS," 141). These features all contribute to the two different segmentation estimates shown as horizontal bars in the upper plot.

FIGS. 11a-11d show examples of Part peak frequency detection. Each figure displays a spectrogram derived from a different vocalization with the maximum frequency achieved by that Part indicated by (142).

Figure 12A:
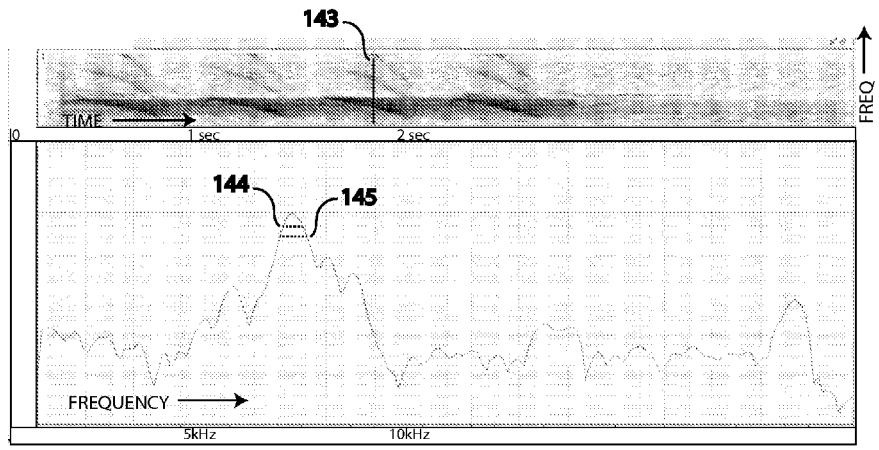
FIGS. 12a-12c illustrate differences of Part midpoint Spans at −5 dB, −10 dB of clear, buzz and noise Parts.
Figure 12B:
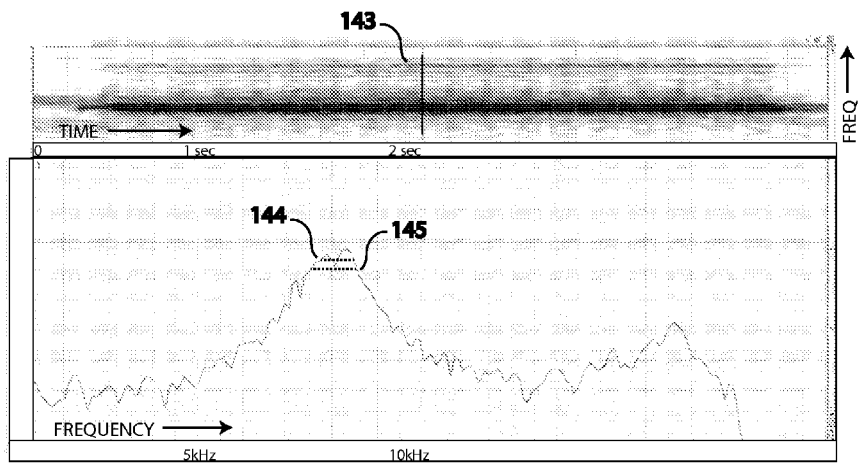
Figure 12C:
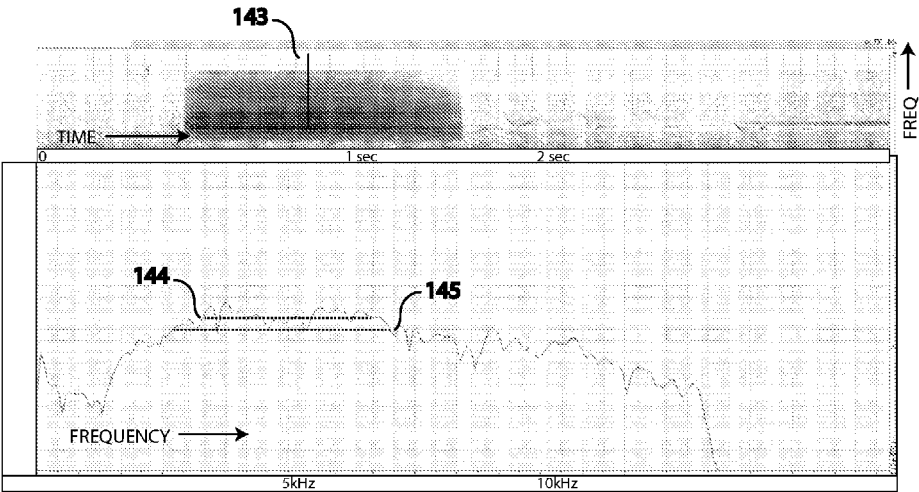

FIGS. 12a-12c illustrate differences in the bandwidth of the spectral peak at approximately the Part mid-point time for a typical "clear" sound (FIG. 12a), a "buzz" sound (FIG. 12b), and a "noisy" sound (FIG. 12c). The frequency spans at −5 dB and −10 dB below the peak value are indicated as (144) and (145), respectively, and the step-wise increase in the bandwidth of the frequency spans from top to bottom is visible.

Figure 13A:
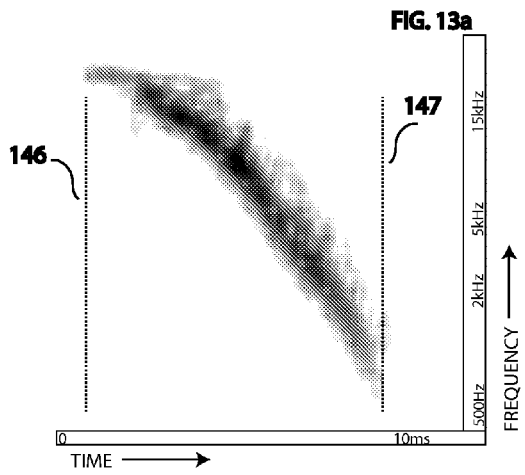
FIGS. 13a-13e are a set of spectrograms that illustrate the time/frequency parameters of a single Part including highest and lowest frequencies, start and end points, and first third, last third and mid analysis points.
Figure 13B:
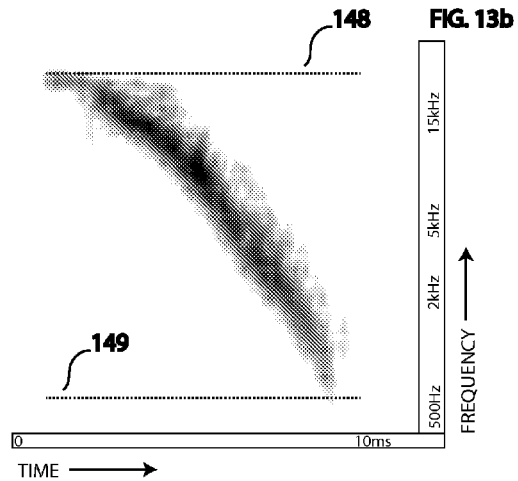
Figure 13C:
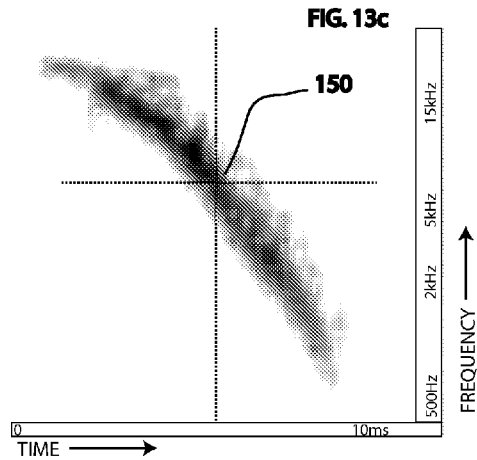
Figure 13D:
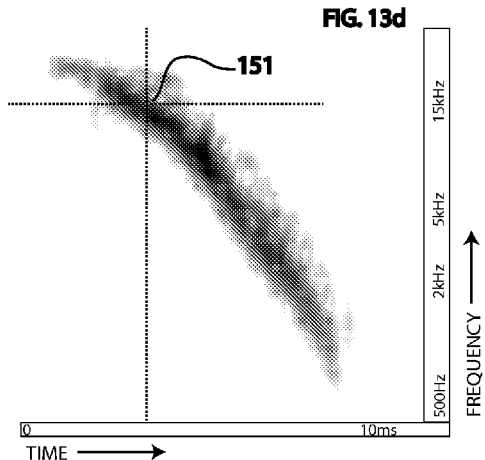
Figure 13E:
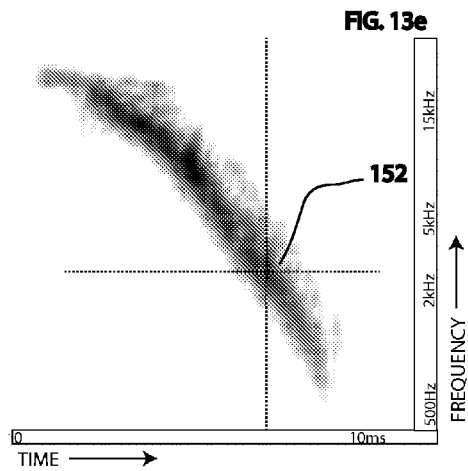

FIGS. 13a-13e are a set of spectrograms that illustrate the time/frequency parameters of a single Part. FIG. 13a shows the spectrogram of a single Part, with the start and stop times indicated as (146) and (147), respectively. In FIG. 13b, the upper and lower frequency bounds are indicated as (148) and (149), respectively. FIGS. 13c through 13e illustrate the time and frequency values for the Part's mid-point (150), first-third point (151), and last-third point (152).

Figure 14A:
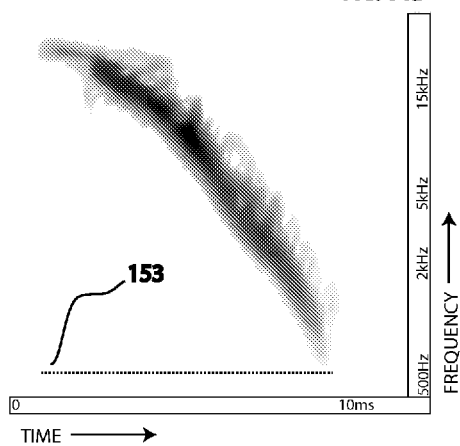
FIGS. 14a-14c show some time/frequency parameters of a Part including Part length, frequency span and speed.
Figure 14B:
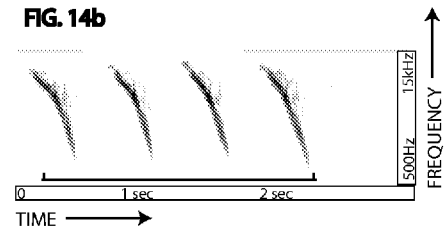
Figure 14C:
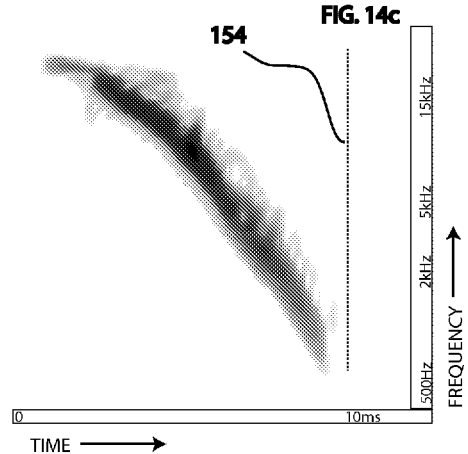

FIGS. 14a-14c show the limits of the time/frequency parameters of a Part within an Element. In FIG. 14a, the spectrogram is annotated with (153) to show the lower-bound frequency; FIG. 14b shows the same for the Parts within an Element. In FIG. 14c, the total frequency span of one Part is indicated by (154).

FIGS. 15a-15g demonstrate the different spectral characteristics of "clear" (FIGS. 15a and 15b), "buzz" (FIGS. 15c and 15d), and "noise" (FIGS. 15e and 15f) Parts. In each case, the left hand spectrograms show the progression from a clear single spectral value (155) to a wide noise band (161), and the right-hand plots show the sequence from a set of narrow, spectrally-related peaks (156, 157 and 158), to a somewhat wider dual peak in the buzz (160), and finally to a wide noise band with no clear peak at all (162). The spectrally complex Parts in FIG. 15g have fast inner development (163), comprising short, high-speed repetitions (trills) of short Parts lasting less than 300 ms.

Figure 16A:
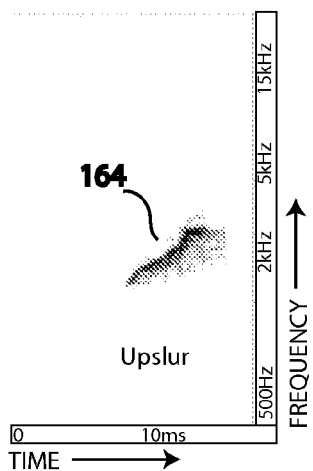
FIGS. 16a-16e present examples of various pitch contours for Parts and time span between two Parts.
Figure 16B:
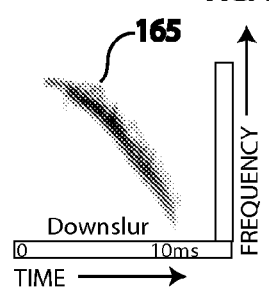
Figure 16C:
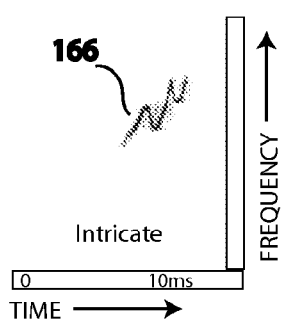
Figure 16D:
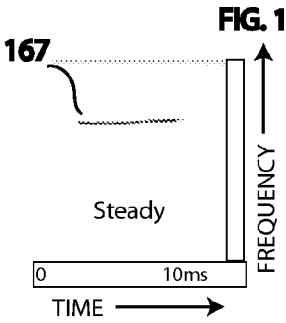
Figure 16E:
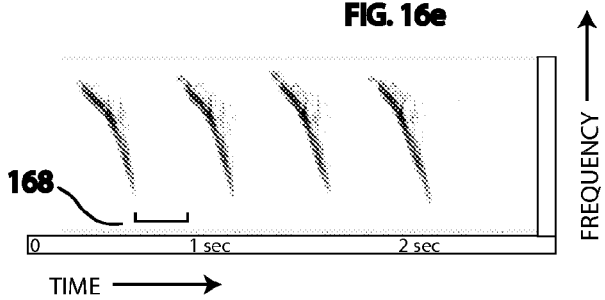

FIGS. 16a-16e present example spectrograms that illustrate various pitch contours for Parts. The Part displayed in the spectrogram of FIG. 16a has a clear upward frequency trajectory (164) (defined as an Intricate Part) whereas the one shown in FIG. 16b has a sharper downward frequency trajectory (165). It is clear that FIG. 16c shows a complex nonlinear frequency trajectory (166), and that the frequency is steady (167) in FIG. 16d. The spectrogram in FIG. 16e shows a repeating Element of similar Parts, with the inter-Part delay or interval identified as (168).

Figure 17A:
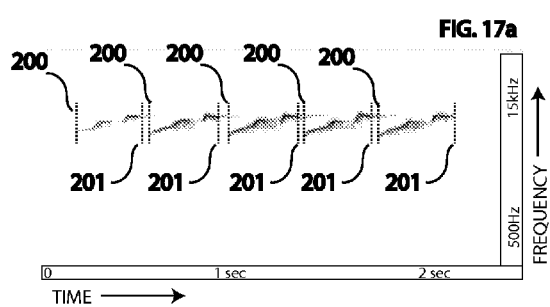
FIGS. 17a-17g give examples of Element segmentation and Part composition in several different Sections.
Figure 17B:
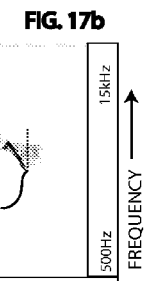
Figure 17C:
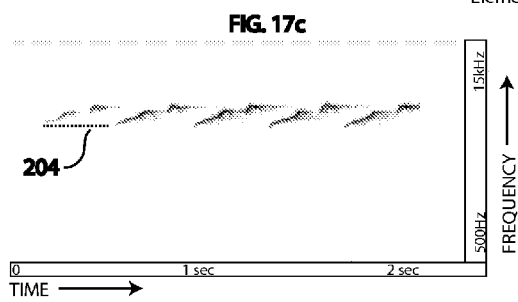
Figure 17D:
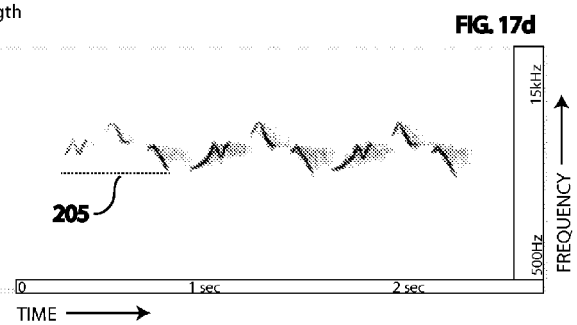
Figure 17E:
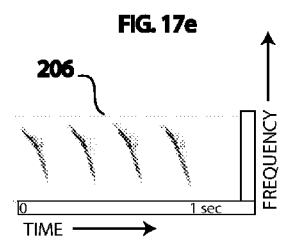
Figure 17F:
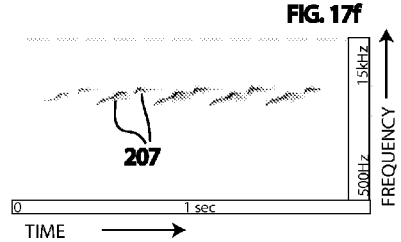
Figure 17G:
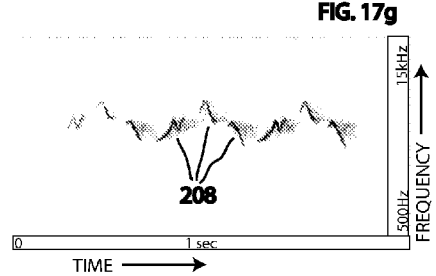

FIGS. 17a-17g give examples of Element segmentation in several kinds of songs. The spectrogram in FIG. 17a is of a song with a sequence of 5 Elements of 2 Parts each; the start and stop times of the Elements are indicated by (200) and (201), respectively. FIG. 17b is the spectrogram of a song with 3 Elements of 3 Parts each, the start and stop times of which are indicated by (202) and (203), respectively. FIGS. 17c and 17d display the same songs as FIGS. 17a and 17b, but in this case the Element lengths are indicated by (204) and (205), respectively. FIGS. 17e through 17g give examples of songs with different numbers of Parts-per-Elements, showing 1 (206), 2 (207) and 3 (208) Parts-per-Element in the 3 examples.

Figure 18A:
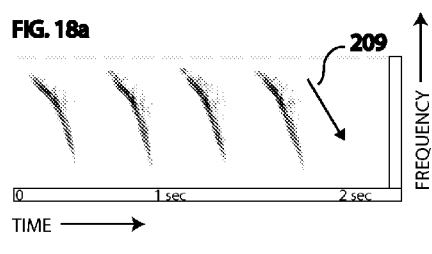
FIGS. 18a-18f illustrate some different kinds of pitch and rhythm profiles for Elements.
Figure 18B:
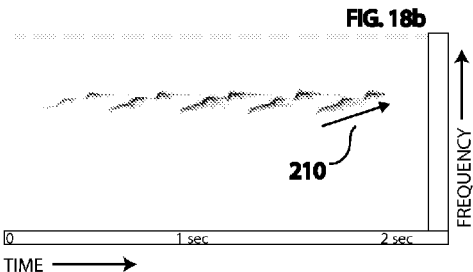
Figure 18C:
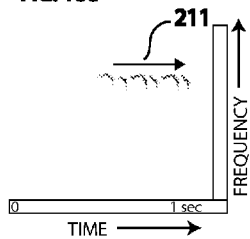
Figure 18D:
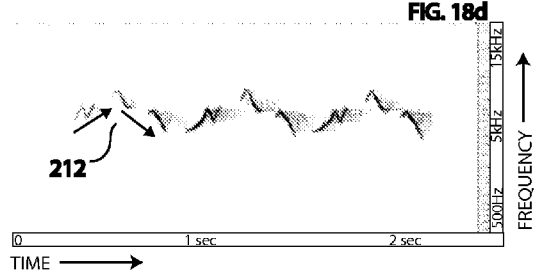

FIGS. 18a-18f illustrate the different kinds of pitch and rhythmic profiles within Elements. The spectrogram in FIG. 18a is of a song where each single-Part Element has a sharp downward or falling frequency trajectory (209), whereas the 2-Part Elements of the song shown in FIG. 18b have a milder upward or rising frequency trajectory (210). A steady frequency trajectory is shown in the 2-Part Elements (211) in the song in FIG. 18c, and a complex up-down frequency trajectory is visible as (212) in FIG. 18d. Contrasting rhythmic profiles are illustrated in the next two figures; the song shown in FIG. 18e has the short-long rhythm indicated as (213), while a different song's short-short rhythmic profile is labeled (214) in FIG. 18f.

FIGS. 19a-19f present examples of pitch spans, frequency spans, and intervals within Elements. FIGS. 19a through 19c demonstrate 3 exemplary pitch spans (ratios between the maximum (e.g., 215) and minimum (e.g., 216) frequencies in a Section); large (217), small (220) and medium (223) pitch spans are shown. Similarly, the range of time intervals between Elements are illustrated in FIGS. 19d through 19f, with long (224), short (225) and medium (226) delays indicated on the figures.

FIGS. 20a-20g demonstrate the variety of phrase qualities in bird songs. FIG. 20a shows the spectrogram of a song with very clear pitch contours (227) of the Parts within the Elements, while the spectrogram in FIG. 20b is a noise Element (228) and the one in FIG. 20c is a buzz (229). Two examples of complex Parts are shown in the spectrograms of FIGS. 20d (230) and 20e (231). The last two figures show two different repetition rates for similar Elements: slow (<10 Elements per second) (232) in FIG. 20f and fast or Trill (>=10 Elements per second) (233) in FIG. 20g.

FIGS. 21a-21f show examples of different Sections and how they are defined by Element changes along with their respective distinguishing characteristics. The song of the spectrogram in FIG. 21a has 3 Sections (300), each delineated by indicators (301 and 302), with obvious changes of speed and phrase type between the Sections. The spectrogram in FIG. 21b is of a song that has 2 Sections (303), each delineated by indicators (304 and 305), again with clear contrasts in speed and phrase type (and also pitch center) between the Sections. FIG. 21c illustrates a song with 2 Sections, the Sectional change created by change of Element pitch. The song whose spectrogram is in FIG. 21d has 2 clear Sections (309), with a change in speed and pitch between them. The final three figures (FIGS. 21e-21g) show even more complex songs, with variations in speed, Element type, quality, and pitch between the Elements of each constituent phrase.

Figure 22A:
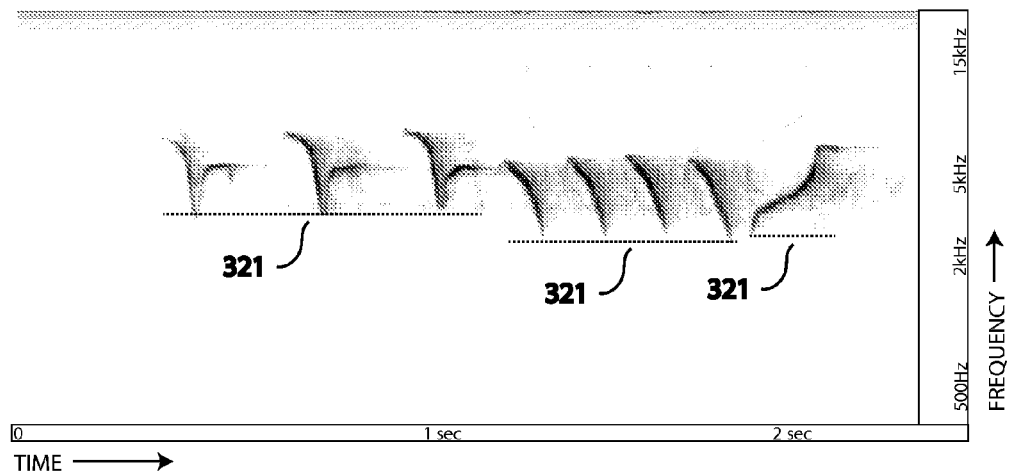
FIGS. 22a-22b show different parameters for Sections including length, high and low frequency, and frequency span.
Figure 22B:
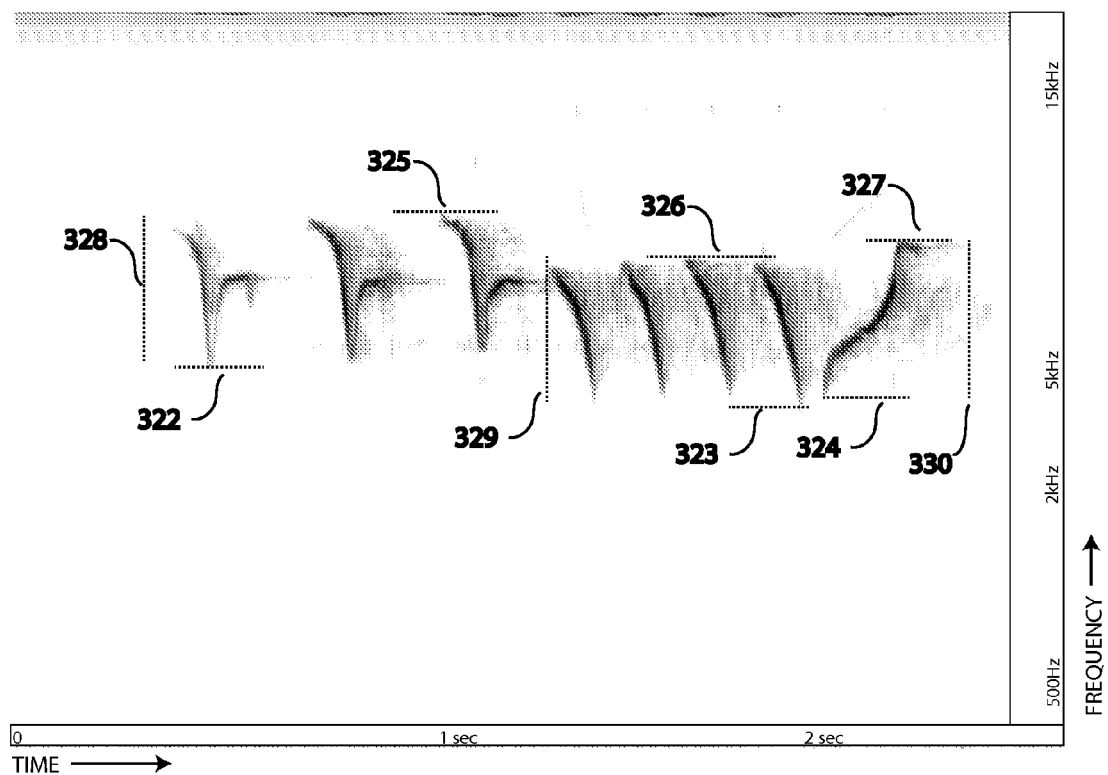

FIGS. 22a and 22b illustrate several Section parameters. The spectrogram in FIG. 22a shows the Section length parameter for three Sections (321). FIG. 22b illustrates the lowest frequency of each Section (322, 323 and 324), the upper pitch bounds (325, 326 and 327), and the Section pitch spans (328, 329 and 330).

Figure 23A:
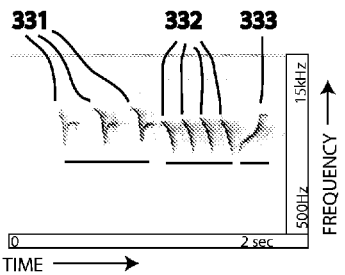
FIGS. 23a-23e contain a collection of songs showing the Parts and Elements that make up each Section and the changes that create the Sectional boundaries.
Figure 23B:
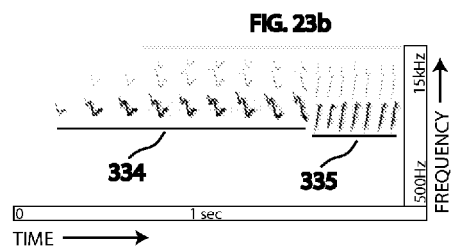
Figure 23C:
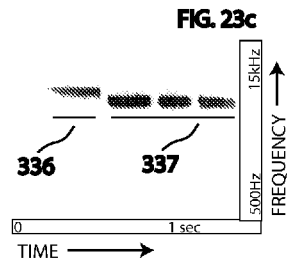
Figure 23D:
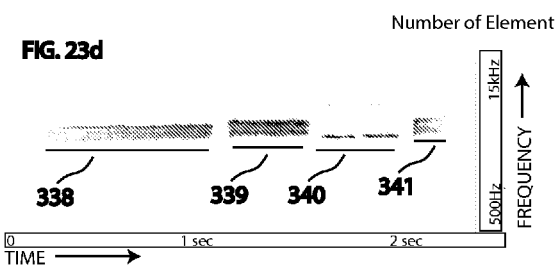
Figure 23E:
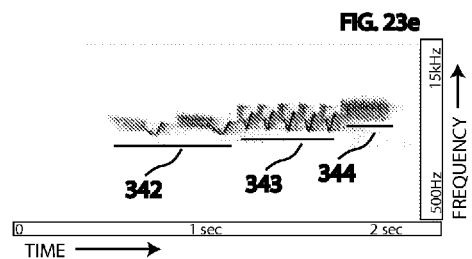

FIGS. 23a-23e illustrate the number of Elements per Section (331, 332 and 333) in FIG. 23a. 334 and 335 in FIG. 23b; 336 and 337 in FIG. 23c; and FIGS. 23d and 23e illustrate different numbers and qualities of Phrases per Section (338-344).

FIGS. 24a-24g present examples of various Section pitch, volume and interval profiles. The spectrogram in FIG. 24a illustrates a Section with a steady pitch profile (345). Contrast this to the rising Section pitch profile (346) of FIG. 24b, the variable pitch profile (347) of FIG. 24c, and the falling profile (348) of FIG. 24d. (349) in FIG. 24e illustrates a growing Section volume profile (indicated by the spectrogram lines becoming darker and darker). FIG. 24f illustrates Section length and the interval between Sections (350, 351). FIG. 24g illustrates the pitch change from Section to Section, defined as the Section pitch interval.

Figure 25A:
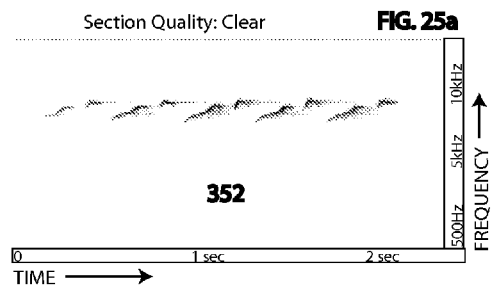
FIGS. 25a-25g give examples of the range of Section quality characteristics in bird songs.
Figure 25B:
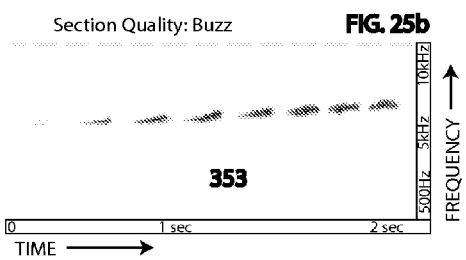
Figure 25C:
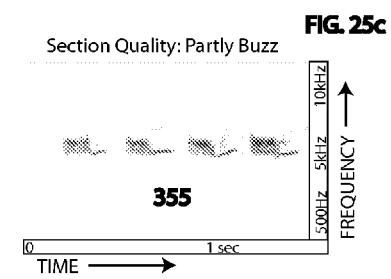
Figure 25D:
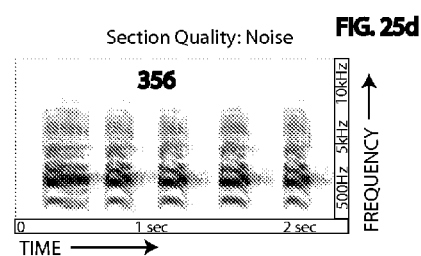

FIGS. 25a-25g give examples of the range of Section quality characteristics in bird songs, with clear Sections seen at (352) in FIG. 25a, buzzy Sections seen at (353) in FIG. 25b, partly buzzy Sections seen at (355) in FIG. 25c, and noisy Sections seen at (356) in FIG. 25d. A complex Section (one containing all complex Elements) is illustrated in 357 of FIG. 25e and a partly Complex (with both complex and clear Parts) is shown in 358 of FIG. 25f, and a trilled Section quality is indicated at (359) in FIG. 25g, with Element speed >=10 Elements per second.

FIGS. 26a-26l illustrate song parameters. In FIG. 26a, the total duration of the song is denoted (400). A variety of song pitch profiles are illustrated in the spectrograms of FIGS. 26b through 26j, with the indicators calling out the upper and lower bounds of pitch (and the pitch span between them) for the whole song. The song of FIG. 26k shows a speeding-up of the Element rhythm over the course of the song, while that of FIG. 26l has a variable rhythmic profile.

Figure 27A:
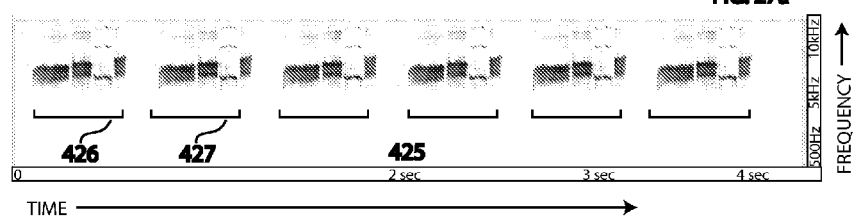
FIGS. 27a-27f are a set of spectrograms that illustrate a range of song types including variable, structured and single call songs.
Figure 27B:
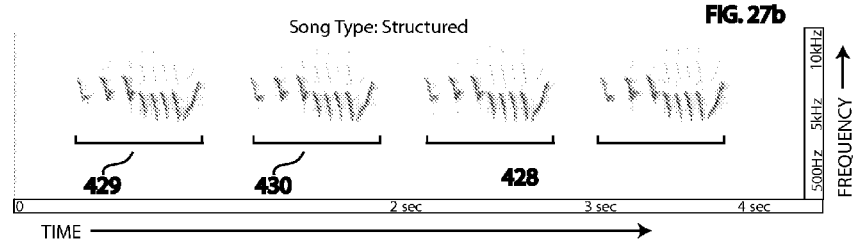
Figure 27C:
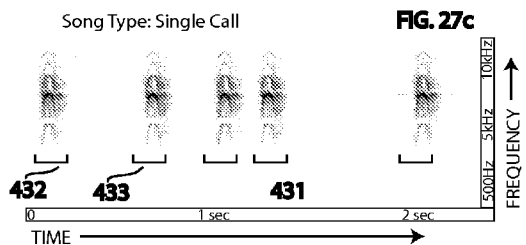
Figure 27D:
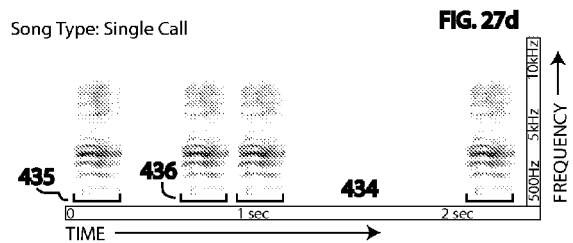
Figure 27E:
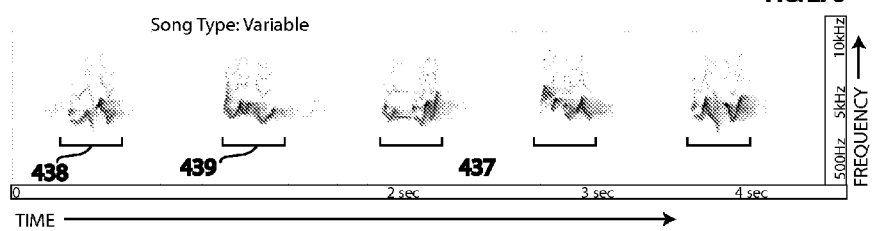
Figure 27F:
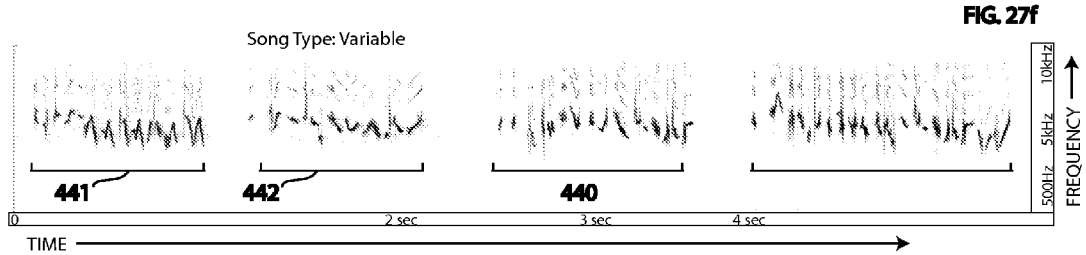

FIGS. 27a-27f demonstrate the three types of song structures. In FIGS. 27a and 27b, the songs are repeated with little or no variation during one singing bout (426 and 427 or 429 and 430) and comprise multi-Element Sections. This illustrates a structured song type. The songs in FIGS. 27c and 27d (432 and 433 or 435 and 436) illustrate the single call song type, which comprise repeated single Elements at irregular intervals during a singing session (431 and 434). Lastly, the songs shown in FIGS. 27e and 27f illustrate the Variable Song type. This song type comprises variable and varying multi-Element songs that do not repeat the same sequence of Parts or Elements during one singing bout. (438 and 439 or 441 and 442).

FIGS. 28a-28g are a set of spectrograms that demonstrate various song quality characteristics; the songs analyzed in the figures include songs with clear (418), buzzy (419), partly buzzy (420), partly complex (421), trilled (422), partly trilled (423) and partly noise (424) song quality characteristics indicated in the figures.

FIG. 29 is a spreadsheet that gives typical values for a collection of characteristic parameters for several songs of the same species; this is called the Identification Parameter Table. The columns list the values for simple features such as song length and overall pitch limits, as well as higher-level derived features such as the numbers of Parts, Element and Sections and their durations. The lines of the spreadsheet listing represent the collection of recorded vocalizations for different members of the same species. The 2 lines at the bottom of the list store the average values of the higher-level derived features for the 3-Section and the 4-Section songs of this collection. The summarized, prioritized and condensed parameters derived from an analysis of all of the individual identification parameters is shown at the bottom of the table and comprises the Master Identification Parameter list.

FIG. 30 demonstrates the process of identification of a vocalization from an unknown species by matching its features against the database of song features for known species. In this example, the left-most column lists the names of a collection of prioritized high-level song features, with arrows pointing to the 2nd column where the values are given for the example vocalization. Starting from a database of 250 known species as shown in the middle column, the list of candidates that could be represented by the given unidentified vocalization is winnowed as each successive feature is applied as a filter to the list. At the conclusion of the process, we are left with only 1 candidate species, meaning that the system has arrived at a high-confidence estimate of the species that generated the vocalization that was analyzed to produce the list of features used in this process.

2. Components

The target audio for the known or unknown species can be captured using a variety of systems (FIG. 2a: 61) including a microphone with a recording device. It could also be captured using a system specifically designed to implement the methods of this invention which would include: a built-in microphone or a microphone-level input to be used with an external microphone; a text, audio, button, screen or other user interface; memory for the file storage systems (FIG. 2a: 62); a processor capable of running the analysis and comparison methods of this invention systems (FIG. 2a: 63); a database for storing the parameters of previously analyzed audio from known sources systems (FIG. 2a: 64); a database for storing the parameters of the analysis of audio from an unknown source; and a text, audio, button, screen or other output interface for presenting results of the analytic process systems (FIG. 2a: 65/66).

As an example, such a system could comprise a combination of hardware and software run by a computer, by a mobile electronic device such as a smart-phone, or by a dedicated stand-alone hardware/software device.

3. Audio File for Analysis

A digitized audio file or buffer of a vocalization is presented for use by the system. This can be a file or buffer that is loaded into the system from an external data store using a USB or similar wide-bandwidth data port, a digital audio data stream captured from a built-in microphone or an exterior microphone via a microphone-level input, or a file from any other current or future storage device or method of storing, or capturing and digitizing audio data (FIG. 2a: 61).

4. Location Metadata

The system can include a built-in GPS receiver (FIG. 2a: 61) that can attach time, date and location metadata parameters to a locally recorded file. In addition, similar time, date and location data created for a recording by an external device can be utilized if provided with the file. This metadata is stored in the appropriate database with the other file parameters.

5. Determining the Exact Portion of File to be Analyzed

Locally or externally recorded digital audio data can include extraneous recorded ambience or background noise along with the audio to be analyzed, and they may also include multiple separate vocalizations to be analyzed. Thus the captured or input audio data can be presented to an end user as a simple graphic display such as an oscillogram waveform display, spectrogram or other visual representation systems (FIG. 2a: 65).

The end user can then highlight the "target audio" to be analyzed using any of a variety of user interface mechanisms including time-range sliders, dragging highlighters, and other means. FIGS. 3a, 3b: 100, 101 are examples of a visual presentation of the target audio—a spectrogram (time vs. frequency plot) and an oscillogram (time vs. signal amplitude plot), respectively. FIG. 3c, 3d: 102, 103 are examples of a slider-based user interface and a reverse highlighting interface to be used by an end user via a touch screen. The user interface example shown in FIG. 10 also shows signal selection sliders between the two panes of the window.

The processor can also utilize amplitude and frequency analysis to narrow the sample to be analyzed to a specific time-range and even a limited frequency range of the target audio.

6. Noise Reduction and Filtering

Figure 4D:
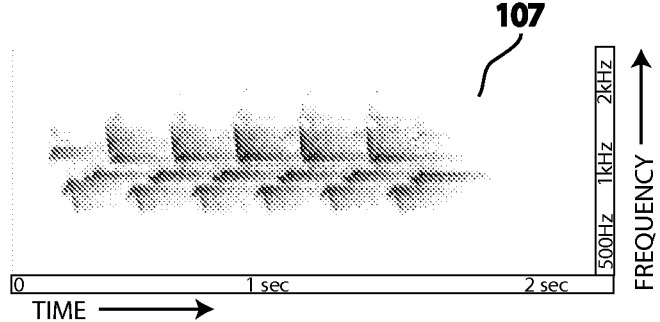

For files with high ambient noise, as indicated by an end user or by analysis of the portions of the file not designated as the target audio, the processor can perform an initial frequency-based and amplitude-based filtering derived from an analysis of the ambient noise levels and frequencies. FIG. 4a: 104 comprises a series of spectrogram plots that illustrate a vocalization accompanied by background ambience, in this case depicted by the gray dots or texture surrounding the black representation of the target audio. FIG. 4c: 106 illustrates a Section of audio outside that target vocalization's audio that can serve as a reference for background noise analysis. FIG. 4d: 107 illustrates a more isolated target audio after the background analysis has been removed using filters, spectral subtraction or other noise-removal methods.

Depending on the target species (bats or birds or frogs or mammals, etc.) the processor can also perform a sharp, "brick wall" filtering process to remove any frequency ranges in the target audio that are not relevant for the target species types, simplifying later analysis. FIG. 4b: 105 illustrates the results of removing all audio in a frequency range below that of the target audio or target species.

7. Signal Analysis and Feature Extraction

After the pre-processing and filtering, the analysis engine processes the target audio data to derive the values for a set of low-level first-pass audio features. This is a multi-stage process that generally begins by breaking the audio data into short buffers or "windows" that represent time periods on the order of 5-20 msec in duration each, applying a weighting function to the data samples in each window, and then analyzing the audio data to collect a plurality of time-domain, frequency-domain, and possibly other classes of analytical parameters that are referred to as the extracted features.

The collection of features (called the "feature vector") will typically include the instantaneous signal amplitude as a root-mean-square or RMS amplitude value mapped to a number expressed in decibels or dB, the relative inter-window change in RMS amplitude, called the delta-RMS, the minimum and maximum RMS amplitude over some time window such as 0.1 second, and possibly other time-domain features.

The audio signal is typically also converted into the frequency domain using a fast Fourier transform (FFT) or similar frequency-domain mapping process such as wavelet or chirp transforms. A plurality of features can then be extracted from this windowed frequency-domain spectrum, including the estimated pitch(es) of a signal window, the relative change in pitch, the purity (harmonicity) or noisiness of the spectrum in the window, the general slope (spectral balance) of the spectrum, and other spectral statistics. FIG. 10 illustrates these kinds of analysis, with 137 showing the results of a spectral peak analysis on the target file, 138 the spectral centroid analysis, 139 a spectral variety plot, 140 the RMS amplitude and 141 the RMS delta.

8. Onset Detection

Given the list of the feature vectors for the set of successive signal windows of the target audio, the method can use any of a number of known techniques to determine where there are significant shifts in the signal's time-domain or frequency-domain features, such as might be found at the beginning and end of a note in a musical recording, or at the limits of a specific Section, chirp or utterance within an animal vocalization. This "onset detection" process is the next stage of the analysis engine, and results in an estimated segmentation of the target audio into a list of Parts.

9. Part Discovery, Mapping and Analysis

A Part is one continuous audio event surrounded by silence or other audio at a lower volume. The boundary of a Part is an abrupt change to a segment of audio that is immediately at least 20 dB lower than the Part audio, or is distinguished by abrupt change in the values of other analysis features.

FIG. 1a illustrates the different parameters presented by a point in time outside the boundaries of a Part (10). In the two views in FIG. 1a, the top plot shows the spectrogram of a segment of a vocalization, and the lower plot shows the smoothed instantaneous spectrum at the time window selected in the spectrogram above it. The line indicated by 013 in the spectrogram view of FIG. 1b shows a time point within a Part and the lines 014 and 015 show the peak and peak-neighbor average energies of the frequencies at that point in time. This data shows higher amplitude and much narrower frequency distribution at 5 dB below the peak frequency presented at that point in time than that found in the surrounding ambience.

In the spectrogram of FIG. 1b, the line indicated by 010 indicates a time point in the interval of "silence" between two Parts and the lines indicated by 011 and 012 show the peak and peak-neighbor average energies of that position, which is at least 20 dB lower than the levels for the time within the Part and with an even frequency distribution presented by ambient noise.

The analysis engine 63/73 next creates a map of each Part as defined above. This map, as defined above, uses the start of the first Part as a 00.000 seconds time reference and all subsequent Part boundaries are referenced in time from this point. In FIG. 5, the time-points labeled as 109-116 signify the beginning and ending times of each of four successive Parts (one of these Parts being labeled as 108) in milliseconds.

Exact boundaries for each Part are defined using a combination of amplitude detection, frequency analysis and other methods as described above. A Part is one continuous audio event, typically (though not necessarily) surrounded by silence or other audio at a significantly lower volume.

FIGS. 7a-7j, 8a-8i, and 9a-9h illustrate another of the techniques for determining Part boundaries. As in FIGS. 1a and 1b, in each of these figures, the top plot shows the spectrogram of a Section of a vocalization, and the lower plot shows the smoothed instantaneous spectrum at the time window selected in the spectrogram. The analysis engine uses the peak point frequency and the accompanying peak frequency widths as defined above. In these figures, the time points labeled as 128, 131 and 134 show the position in time that is being analyzed. 129, 132 and 135 show the peak point frequency; 130, 133 and 136 illustrate the peak frequency bandwidth at 10 dB below the peak point frequency. The peak point frequency at the beginning and at all other points in the Part is at least 20 dB above the peak point frequencies of the surrounding ambience, i.e., the peak is narrower and more distinct in frequency.

These figures show Part detection for three different qualities of Parts (clear, buzz and noise, defined below) in FIGS. 7a-7j, 8a-8i, and 9a-9h respectively.

Other signal parameters that can be used on onset detection and Part discovery as outlined above are shown in FIG. 10, in which the top pane shows an oscillogram and the bottom pane a spectrogram along the same time axis. The features plotted over the spectrogram include: Spectral Peak 137, Spectral Centroid 138, Spectral Variety 139, RMS amplitude 140 and RMS Delta 141. The regions drawn as horizontal bars in the oscillogram view show the estimates of where the Parts begin and end.

A map of the position in time and other parameters of each Part are made in the database. Depending on the type of species being analyzed, many different parameters are analyzed and stored.

FIG. 5 illustrates a map of the start (109, 111, 113, 115) and end times (110, 112, 114, 116) of four different sequential Parts. FIGS. 13a-13e illustrate the start and end points for a Part (146,147), the high and low frequencies (148,149), and frequency and location in time of the middle, first third and last third points of analysis for this Part (150-152). For some files the positions for this analysis could take the form of Part start time+n ms, start time+2n, start time+3n, etc.

Figure 11A:
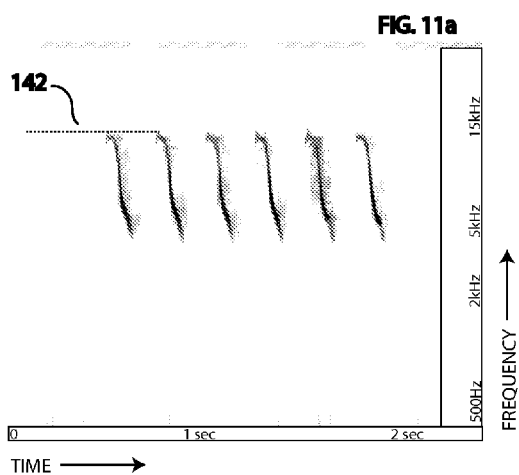
FIGS. 11a-11d show examples of the results of Part peak frequency detection.
Figure 11B:
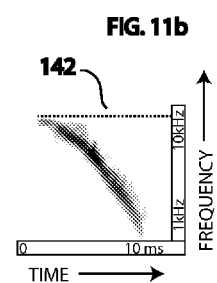
Figure 11C:
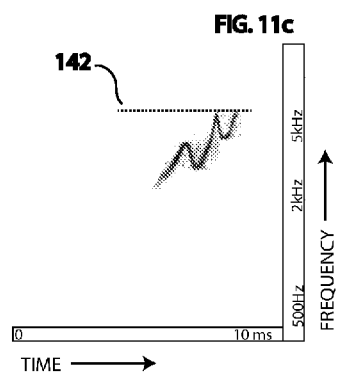
Figure 11D:
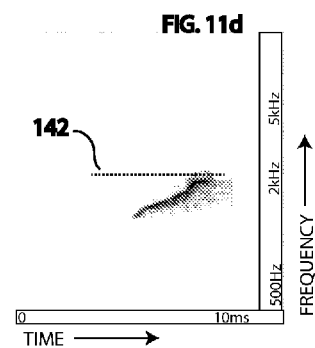

FIG. 11c: 142 (in FIG. 11a, b, c, d) illustrates the highest frequency of a Part. The analysis of this point can also include its position in time, and the amplitude of the peak frequency.

An analysis is also made of the frequency widths at the 5 dB and 10 dB points below the peak frequency in a Part as shown in FIG. 12.

FIG. 12b, 143 illustrates the point of analysis in the whole Part. 144, 145 illustrate the segment widths of the frequencies that are 5 and 10 dB below the peak frequency at these points in time.

Other data may also be stored depending on the target species and the results of the prior analysis. Then defined parameters based on the prior analysis can be assigned.

FIG. 14a: 153 illustrates the Part length parameter.

The frequency span parameter is illustrated in FIG. 14c: 154. From the Part length and Part frequency span another parameter can be derived, the Span to Length Ratio (Frequency Span/Length).

The Part quality is derived from the preceding and further analysis as illustrated in FIGS. 15a-15g.

Figure 15A:
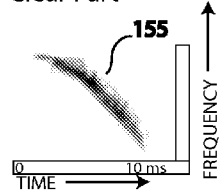
FIGS. 15a-15g show spectral characteristics of Clear, Buzz and Noise Parts and examples of Complex Parts.
Figure 15B:
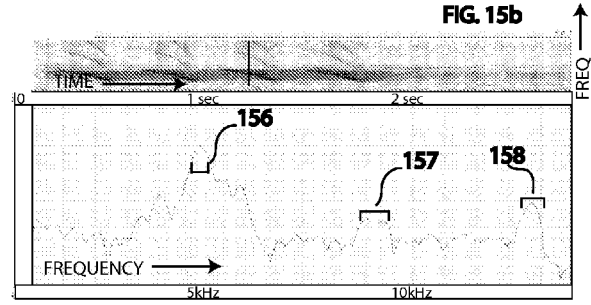

FIG. 15b: 156-158 illustrate the analytic characteristics of a clear Part including a narrow peak frequency bandwidth, and additional secondary peak frequencies at integral multiples of the peak frequency.

A Part with a clear quality is one with a simple frequency profile such that, at any one point in time during the Part, it has a narrow peak frequency width of <x ms (depending on the type of animal) at the −5 dB from peak point frequency and (<y ms) at the −10 dB peak point frequency positions. As an example of the parameter range for this analysis, the −5 dB frequency span of a clear songbird Part would be 400-600 Hz and the −10 dB span would be 600-800 Hz. Usually the next lowest amplitude peak point frequency is a harmonic, at a frequency that is an integral multiple of that peak point frequency. As mentioned above, FIGS. 7a-7j illustrate the peak point frequencies (129) and the peak frequency widths (130) at −10 dB from the peak point frequency of several different locations (128) within a clear Part as well as some points outside the Part.

Figure 15C:
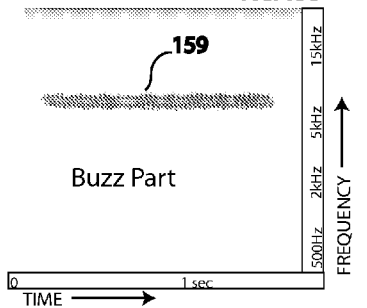
Figure 15D:
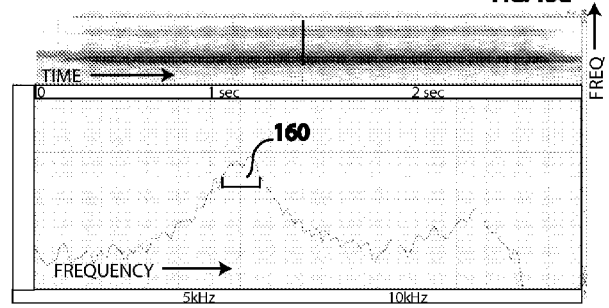

FIG. 15c, 15d: 159, 160 illustrate the analysis and quality of a buzz Part illustrating a broader frequency segment at 5 and 10 dB below the maximum peak frequency.

A Part with a buzz quality has a wider frequency profile than a clear Part and includes many frequencies sounded simultaneously within a medium frequency bandwidth. This is defined by the −5 dB and −10 dB peak frequency width parameter (of >xxx ms; <yyy ms respectively.) As an example, for a song bird, the −5 dB span for a buzz Part would range from 1000-1500 Hz and the −10 dB span would be wider, at 1500-2000 Hz.

Figure 15E:
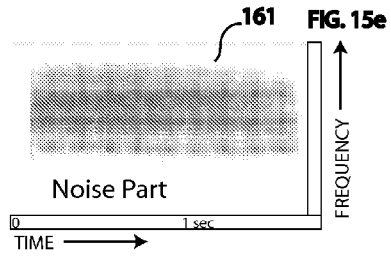
Figure 15F:
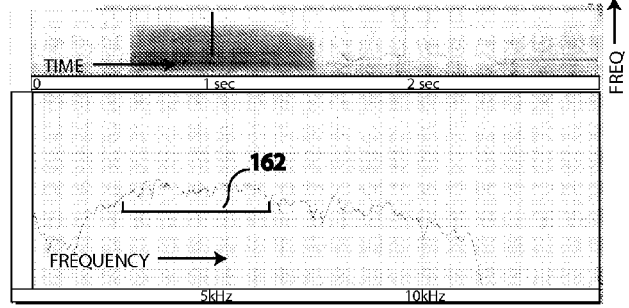

FIG. 15e, 15f: 161, 162 illustrate the even broader peak frequency characteristic of a noise Part.

A Part with a noise quality has a much wider frequency profile and includes many frequencies sounded simultaneously within a wide frequency bandwidth. This is defined by the −5 dB and −10 dB peak frequency width parameter (of >xxxx ms; <yyyy ms respectively, depending on the type of species). As an example, the −5 dB frequency span of a song bird with a noise Part could be 4,000-5,000 Hz.

As mentioned above, FIGS. 8a-8i illustrate the peak point frequencies (132) and the peak frequency widths (133) at −10 dB from the peak point frequency of several different locations (131) within a buzz Part as well as some points outside the Part. FIG. 9a-9h illustrate the same for a noise Part.

Figure 15G:
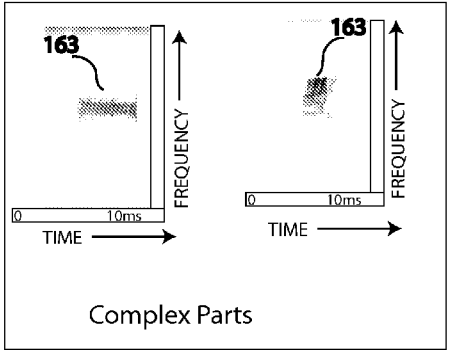

FIG. 15g: 163 illustrates examples of complex Parts. A complex Part is a trill (series of clear Parts repeated faster than 9 Parts per second) that lasts less than 300 ms.

In addition to determining the above parameters, other parameters are derived from further frequency, time and amplitude analysis. For clear Parts, these include the shape and pitch profile of the Parts. The pitch profile of a Part is a description of the smooth trend of the pitch from beginning to end of the Part.

FIG. 16a: 164 illustrates an upslurred Part. FIG. 16b: 165 illustrates a downslur. FIG. 16c: 166 illustrates an intricate Part. FIG. 16d: 167 illustrates a Part with a steady pitch profile.

FIG. 16e: 168 illustrates the interval between one Part and the next. Part Speed and Interval Coefficient (Interval/Length) can be derived from these parameters.

FIGS. 6a-6i provide several more illustrations of several different Part types and qualities. 6a illustrates a clear Part with a falling pitch profile, 6b a clear Part with a rising pitch profile, 6c a Part with an intricate profile that includes at least two changes in pitch direction. 120 illustrates 3 Parts of different profiles that make up one Element. 121 and 122 illustrate Part length and the interval from one Part to another. 123 and 124 illustrate short downslurs and upslurs sung at trill speed (>=10 Parts per sec). 125 illustrates a noise Part; 126 shows 3 buzz Parts; and FIG. 6i illustrates several kinds of Parts in one song.

10. Element Discovery, Mapping and Analysis

Elements are structural entities comprising a single Part or 2 or more Parts repeated more than once as a group. An Element comprising only one Part is a 1-Part Element; an Element with a repeated group of two Parts is a 2-Part Element, one with three Parts is a 3-Part Element, etc.

Based on the Part map described above, a map of the Elements of the vocalization is made and stored. This map includes many parameters.

FIG. 17a: 200 illustrates Element start points of 5 Elements and FIG. 17b: 202 illustrates the start points of 3 different Elements.

FIG. 17a: 201 illustrates the end points of 5 Elements, and FIG. 17b: 203 the end points of 3 other Elements.

FIG. 17c, 17d: 204, 205 illustrate the Element length parameters for two different Elements The number of Parts in the Element is also determined. FIG. 17e: 206 illustrates 1-Part Elements, FIG. 17f: 207 illustrates 2-Part Elements and FIG. 17g: 208 illustrates 3-Part Elements.

The pitch profile of the Element is also determined. FIG. 18a: 209 illustrates a falling Element pitch profile, FIG. 18b: 210 illustrates a rising pitch profile, FIG. 18c: 211 illustrates a steady pitch profile, and FIG. 18d: 212 illustrates an up/down pitch profile. Elements can have other pitch profiles including variable.

Figure 18E:
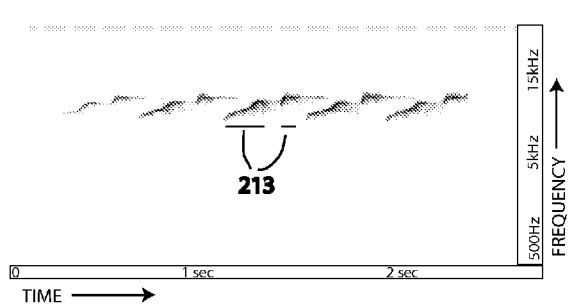
Figure 18F:
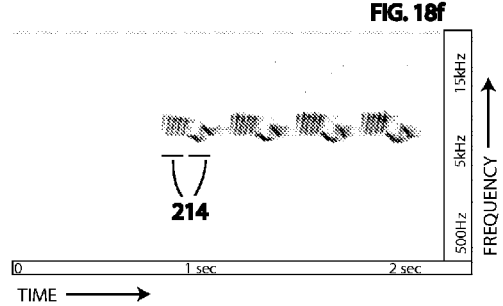

The rhythm profile of the Element is determined based on the comparative length of the contained Parts. FIG. 18e: 213 illustrates an uneven Element rhythm profile and FIG. 18f: 214 illustrates a steady pitch profile. Elements can have other rhythm profiles including variable.

Element frequency characteristics are also determined based on the parameters of the contained Parts. FIGS. 19a-19c: 215, 218, 221 illustrate the maximum Element frequency of the example Elements. FIGS. 19a-19c: 216, 219, 222 illustrate the lowest or minimum Element frequency. FIGS. 19a-19c: 217, 220, 223 illustrate the total frequency span of the Element. Other Element frequency characteristics can also be defined.

The interval or length of time from a target Element to the next Element is also determined as illustrated in FIGS. 19d-19f: 224, 225, 226. From the prior parameters, the Element Interval Coefficient can be determined (Element Interval/Element Length).

The Element quality is also determined based on the combined quality of the contained Parts. FIG. 20a: 227 illustrates a clear Element, with 3 clear Parts. FIG. 20b: 228 illustrates a buzz Element. FIG. 20c: 229 illustrates a noise Element. FIG. 20d: 230 illustrates a complex Element and FIG. 20e: 231 illustrates a complex Element. Other Element qualities can be defined including partly complex, when only 1 Part of a 2- or more-Part Element is complex; and partly buzz when only 1 Part of a 2- or more-Part Element is a buzz.

Element speed is also determined and a speed category is assigned. FIGS. 20f and 20g illustrate two different speed categories. 232 is a countable Element speed of less than 10 Elements per second. 233 illustrates a trill Element speed, >=10 Elements per second.

11. Section Discovery, Mapping and Analysis

Sections are defined as one unique Element or a collection of similar, repeated Elements. Sectional changes are triggered by changes in Element quality, Element pitch changes of >x hertz, changes in speed greater than y Elements per second; by an Element interval change >z ms; and abrupt changes in other parameters. The exact parameters used to identify a new Section differ depending on the type of species. For example, for passerine song birds, the change in pitch is usually >400 Hz, the change in speed is >20% of the previous Part speed, and the change in interval >20% of the previous Part intervals.

FIGS. 21a-21g illustrates several Sectional changes. 300 illustrates 3 Sections differentiated by changes in speed and Element type. 303 illustrates 2 Sections differentiated by changes speed and pitch. 306 illustrates 2 Sections differentiated by pitch. 309 illustrates 2 Sections differentiated by speed, pitch and Element type. 312 illustrates 4 Sections differentiated by change in Element quality, pitch and length. 315 illustrates 5 Sections differentiated by quality, speed, length and pitch. 318 illustrates 3 Sections differentiated by pitch, Element type and speed.

Based on the data stored in the Element map described above, a map and other parameters of the Sections of the vocalization is made and stored.

FIGS. 21a-21g illustrate a map of the start points (301, 304, 307, 310, 313, 316, 319) and end points (302, 305, 308, 311, 314, 317, 320) for each Section.

FIG. 22a: 321 illustrates Section length. FIG. 22b: 322, 323, 324 illustrate the lowest Section frequency. 325, 326, 327 illustrate the highest Section frequency. 328, 329, 330 illustrate the Section pitch span.

Another characteristic for each Section is the number of Elements in the Section. FIG. 23a: 331 illustrates a Section with 3 Elements; 332 a Section with 4 Elements; 333 a Section with 1 Element.

FIG. 23b: 334 illustrates a Section with 9 Elements; 335 a Section with 7 Elements; 336 a Section with 1 Element; and 337 a Section with 3 Elements.

FIG. 23d: 338 shows 1 Element, 339, shows 1 Element, 340 shows 2 Elements and 341 illustrates a Section with 1 Element.

FIG. 23e: 342 shows 2 Elements; 343 shows 5 Elements; and 344 shows a Section with 1 Element.

The pitch profile of the Section is determined using Part and Element parameters. Defined pitch profiles include steady as shown in FIG. 24a: 345; rising as shown in FIG. 24b: 346; variable as shown in FIG. 24c: 347; and falling as illustrated in FIG. 24d: 348.

The volume profile of the Section is also determined using the amplitude analysis of its Parts and Elements. FIG. 24e: 349 illustrates a growing volume profile.

The interval from the target Section to the next Section is determined as illustrated in FIG. 24f: 350, 351. The pitch interval for each Section is determined as illustrated in FIG. 24g: 350a, 351a.

The rhythm profile of the Section is determined and assigned a defined quality. These include steady, uneven and variable. The profile is based on the relative length of each Part and the intervals between Parts.

Figure 25E:
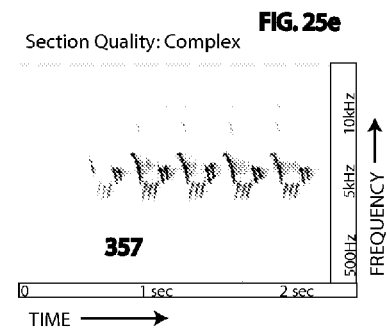
Figure 25F:
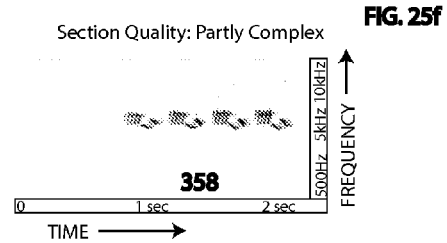
Figure 25G:
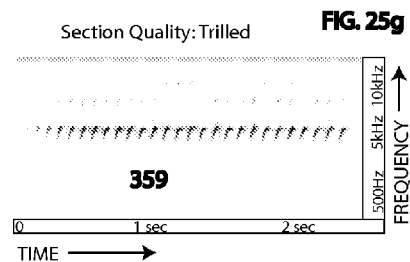

The Section quality is assigned based on the quality of its contained Parts and Elements. FIG. 25*a*: 352 illustrates a clear Section quality based on it containing only clear Parts. FIG. 25*b*: 353 illustrates a Section with a buzz quality. FIG. 25*c*: 354 is a Section with a partly buzz quality. FIG. 25*d*: 356 illustrates a noise Section. FIG. 25*e*: 357 illustrates a Section with a complex quality. FIG. 25*f*: 358 shows a Section with a partly complex quality and FIG. 25*g*: 359 a trilled Section. Other possible Section quality parameters include partly noise quality (not depicted).

12. Song Analysis

A song is defined as a collection of one or more Sections vocalized with intervals <=0.75 seconds. Longer intervals between Sections indicate a new song.

For vocalizations with more than one Section, a song analysis is performed, extracting certain features for the whole vocalization.

FIG. 26*a*: 400 illustrates the song length parameter. FIGS. 26*b*-26*d* illustrate the song frequency parameters, which include highest frequency (401, 404, 407); lowest frequency (402, 405, 408); and frequency span (403, 406, 409).

The number of Sections in the song is stored. FIG. 26*e*: 410 illustrates a song with 3 Sections; FIG. 26*f*: 411 shows a song with 2 Sections; and FIG. 26*g*: 412 a song with 4 Sections.

The pitch profile of the song is derived from the parameters of the included Parts and Elements. FIG. 26*h*: 413 illustrates a song with a rising profile, FIG. 26*i*: 414 one with a falling profile and FIG. 26*j*: 415 one with a variable profile. Other song profiles include a steady profile (not depicted).

The rhythm profile of the song is determined. Defined qualities include steady (FIG. 26*k*: 416), uneven (not depicted), and variable (FIG. 26*l*: 417).

Figure 28A:
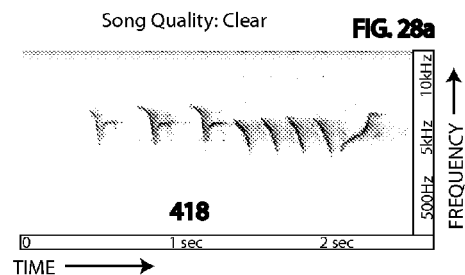
FIGS. 28a-28g are a set of spectrograms that illustrate various structured song quality characteristics.
Figure 28B:
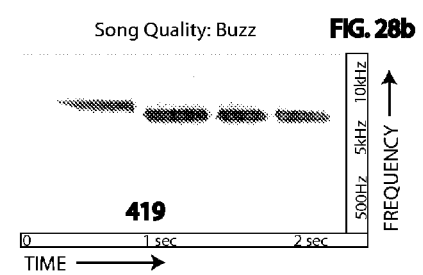
Figure 28C:
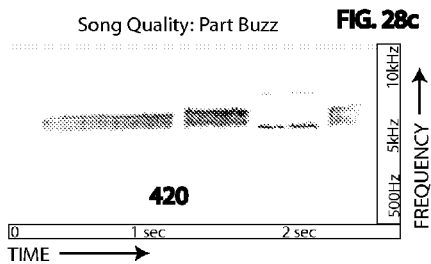
Figure 28D:
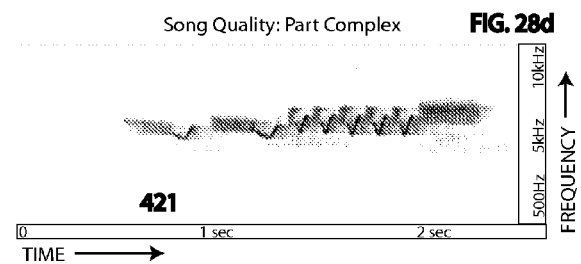
Figure 28E:
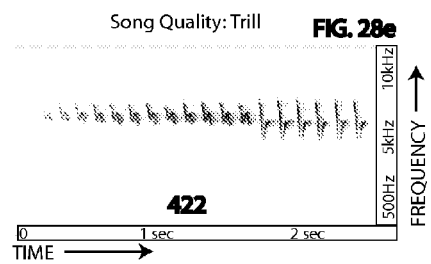
Figure 28F:
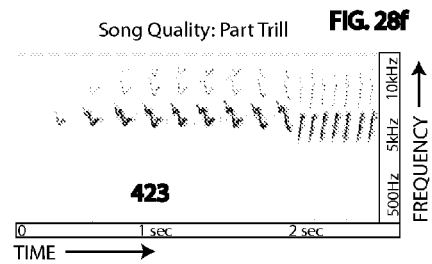
Figure 28G:
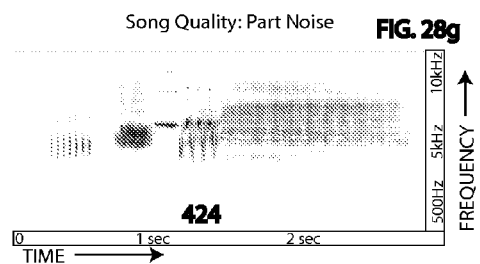

The song quality is determined based on the quality of the contained Parts. FIG. 28*a*: 418 illustrates a clear song that contains only clear Parts. FIG. 28*b*: 419 illustrates a buzz song, FIG. 28*c*: 420 a partly buzz song, FIG. 28*d*: 421 a partly complex song, FIG. 28*e*: 422 a trill song, FIG. 28*f*: 423 a partly trill song and FIG. 28*g*: 424 a partly noise song. Other song qualities can include complex and noise. A song is considered partly buzz or partly complex when 50-75% of the song consists of buzz or complex Parts.

The song type is also determined based on the variety and type of Parts, Elements and Sections. The song type parameters include structured, which are songs that are repeated with little variation from iteration to iteration and that have a fixed structure of Parts, Elements and Sections. FIG. 27*a*: 425 and FIG. 27*b*: 428 are examples of structured songs. 426, 427 and 429, 430 are examples of individual songs, repeated almost exactly during one singing session.

Single Call songs are 1-Part Elements that are repeated without a regular pattern of number or interval. FIG. 27*c*: 431 and FIG. 27*d*: 434 are examples of single call songs. 432, 433 and 435, 436 are examples of single call songs that are repeated without a regular interval.

Variable songs are songs that vary in Part type, sequence, timing and pitch profile, amongst other parameters, from song to song. FIG. 27*e*: 437 and FIG. 27*f*: 440 are examples of variable song types. 438, 439 and 441, 442 are examples of variable songs. Each song is significantly different from the prior song due to changes in Element or Part types, sequence of Elements or other parameter changes.

13. Further Processing and Analysis

Based on the parameters extracted in the processes introduced above, further analysis may be performed on the Parts, Elements, Sections and full song. These could be required based on the type of song, the type of animal vocalization, and other factors derived from the results of the analysis.

14. Database Processing

All of the identification parameters listed above are stored in a system database. If the source is from a known species and song variation type, the data is stored with other data from the same vocalization variation type in the known species identification parameter database. This data is then processed as outlined below.

If the song is unknown the identification parameters are stored in the unknown species database for further processing, comparison with the known species master identification parameter database, and for subsequent identification.

15. Database Processing of Known Species

The vocalizations of birds, frogs and other animals usually consist of one main, distinctive vocalization type and often several recognizably different variant types. For New World Warblers, for example, the accented songs used to attract females and the unaccented songs used to defend territories would represent a main song type A and a variant song type B. Variant types are vocalizations that significantly differ from the main type in two or more of the categories of analysis listed above. For example a vocalization with 2 Sections and a vocalization with 3 Sections would represent two vocal variant Types.

FIG. 2*a* illustrates the work flow of analysis performed on a known species. After the analysis of a known vocalization type is performed for a known species, the resulting identification parameters are stored in the known species identification parameter database. Subsequent analyses of other vocalizations of this same species and type are stored with it in the same section of the database.

Once several different samples of one species and song type are available, the processor performs an analysis of the combination of these identification parameters for all of the samples and derives a species song type reduced master identification parameter list. A simple block diagram of this is shown in FIG. 2*c*. This process involves different steps including doing average or mean analysis of many of the parameters. It also can include disregarding highest and lowest variants and other statistical analysis depending on the range of variation and type of parameter. Various heuristic strategies are used to find the common and simplest diagnostic parameters for each species' song type.

The results will be the Species Master Identification Parameter for each of the analysis data points for that song type. For example parameters can include song length average and range, Section number, averages and ranges for lowest and highest frequency and frequency span, song pitch profile, song rhythm profile, song quality and summaries of other identification Parameters as listed above. These parameters are given a priority weighting and whenever possible a small subset of diagnostic parameters is highlighted.

A sample of the data points for individuals and the Master Identification Parameter list for one species is found in FIG. 29.

This Species Master Identification Parameter list is updated with each new analyzed sample of the same species and song type.

16. Adding New Song Types

When new, previously not included, known song types are analyzed to be added to the database, the species song type Identification Parameter list is prepared and then compared to the Master Identification Parameter list of all other species in the known species database. This is illustrated in a simple block diagram in FIG. 2d. If there is overlap so that there are then not enough unique identification parameters for this new species or song type, then additional analysis is performed or new analytic categories are added.

For example, there may have been, in the known species identification parameter database, only 1 species that sings 1-Section Songs with 3-Part Elements. Therefore these two parameters, 1-Section song +3-Part Elements, were diagnostic for that species song type. No other parameters were necessary for that species in its Master Identification Parameter list.

If a new species that also sings 1-Section Songs with 3-Part Elements is added to the database, then some other identification parameter, such as pitch contour of the Elements, will be added to the Master Identification Parameter list for each species and the new list will serve to separate these two species song types.

17. Analysis of Unknown Songs

An unknown vocalization is analyzed using the method detailed above. The resulting species identification parameters are then compared to the Species Master Identification Parameters for each known song type in the database to find the identity of the unknown species. FIG. 2a is a simple block diagram of this Part of the system.

The matching procedure can involve a direct match (such as a 1-Section Song with 3-Part Elements within the pitch range, length, speed and other averages for species A song Type A) resulting in a positive identification.

Various heuristic techniques can also be used that weigh how the parameters are matched to result in a species' identification with a given level of confidence. In addition, a second or third species can be listed as a possible candidate, along with their respective confidence level. The techniques that would be used for this in the preferred embodiments include rule-based expert systems and statistical distance metrics, both of which are known to those skilled in the art.

For example, a species that matched all parameters but was outside the length range could be presented with 9x% confidence. Another species that matched several but not all of the ID Parameters could be listed as a second possible match, but with a lower confidence %.

The number of parameters needed for a 95+% identification and what confidence levels are assigned for a lower number of matching ID Parameters is set during the analysis process for that song type.

18. Species Matching Comparison Flow

There are several options as to the matching or classification technique that can be used to aggregate the high-level song identification parameters and map them onto a species estimate and classification confidence.

A simple and efficient matching process would use a decision tree process. Analyzed parameters would have priority rankings and be used to make the broadest possible separations for the fastest and most efficient identification.

A more sophisticated and scalable method would use a rule-based expert system to compare and weight the level song identification parameters to lead to a species estimate and classification confidence value.

For example, parameters including location, date and time, Song Quality, Song Pitch Profile, Section Number can be used first to quickly limit the number of possible candidates. This process also facilitates assigning a confidence level and picking a secondary song candidate.

FIG. 29 illustrates one possible example of this prioritized "branching tree"-style comparison. Here the parameters used first are those that can serve to separate the most species per question (ideally a parameter held by only half of the known species). In this example, the location is first considered. Since the target species in this example was recorded in the state of New York, all species not found in the area are thus eliminated. The date eliminates other candidates that would not be found at that time of year. The song type and quality are then used as another high-level separator; in this case, the song has a buzz quality and is structured, which eliminates about half of the remaining species. Other identification parameters are then used to reduce the possible candidates to 1.

19. Storage and Output Interface Messaging for Unidentified Vocalizations

If the unknown vocalization cannot be matched to a species song Type in the database with greater than 75% confidence level, the vocalization can be stored for later analysis. In some cases, this storage can be local or can be sent via high bandwidth wireless technology to a development site for further analysis. It can also return a message to the end user indicating possible reasons such as a poor recording, conflicting data points that indicate more than one species singing, noise levels so high they mask the target audio and other factors.

The output interface, if a loudspeaker is used, can include a generated audio "response" including the species name, confidence level, or note about re-recording the species. It can also include a screen-based text or visual message, a note or email, or any other similar feedback mechanisms. This is illustrated by the block diagrams in FIGS. 2a-2d.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A method for identifying the species, appearance or other characteristics of an animal based on vocalizations, comprising:
   a. capturing the sound of an animal vocalization onto a digital device as sampled digital audio data;
   b. performing signal analysis on the sampled digital audio data to extract a plurality of analysis features comprising one or more of: spectral peak, spectral centroid, spectral variety, spectral harmonicity, RMS amplitude, RMS delta, and spectral peak delta, which describe low-level time-domain and/or frequency-domain properties of the sampled digital audio data;
   c. using the plurality of analysis features to perform audio onset detection, event delineation and event grouping to determine break-points in time that describe individual time-segments or notes (hereinafter "Elements") and groups of Elements, (hereinafter "Phrases") of the vocalization captured in the sampled digital audio data;
   d. using the plurality of analysis features and audio onset detection/segmentation results, perform Element and Phrase analysis to extract a plurality of high-level symbolic features, the plurality of defined high level Element/Phrase features comprising one or more of: symbolic duration and/or inter-onset (IOI) ratio, symbolic loudness,
symbolic pitch and pitch span,
symbolic tone-color quality chosen from a plurality of defined qualities comprising one or more of noise, clear, formant, complex, and buzz,
symbolic pitch shape and profile chosen from a plurality of defined profiles and shapes comprising one or more of steady, slur-up, slur-down, bow-up, bow-down, trill, vibrato and chaotic,
symbolic amplitude envelope shape and profile chosen from a plurality of defined profiles and shapes, comprising one or more of steady, percussive, ADSR, swell, tremolo and chaotic, and
symbolic time and pitch intervals between the Elements and/or Phrases;
e. using information in the plurality of low-level analysis features and high-level symbolic features to identify a match within a collection of similar features extracted or derived from vocalizations of a plurality of animals of a plurality of known species.

2. The method of claim 1, wherein the match identification process also uses metadata related to the capturing the sound of the vocalization, the metadata comprising time, date, and/or geographical location of the capturing of the sound of the animal's vocalization.

3. The method of claim 1, further comprising: isolating the sampled digital audio data from a larger digital audio data sequence, using a plurality of amplitude and frequency analysis methods.

4. The method of claim 1, further comprising: removing ambience or background noise in the sampled digital audio data by using amplitude-based and frequency-based analysis or filtering methods to enhance a signal-to-noise ratio of the sampled digital audio data.

5. The method of claim 1, further comprising: enhancing the sampled digital audio data through the use of band-limiting frequency filters that remove all frequencies outside the desired bandwidth of the sampled digital audio data.

6. The method of claim 1, wherein the plurality of analysis features comprise amplitude and frequency for the peak frequency for each Element and/or Phrase.

7. The method of claim 1, wherein the plurality of analysis features comprise a peak frequency bandwidth for each Element and/or Phrase.

8. The method of claim 1, wherein the plurality of analysis features comprise one or more of time, location, frequency, and amplitude, for a plurality of break-points in each Element and/or Phrase.

9. The method of claim 1, further comprising:
detecting repeated Elements and/or Phrases in the vocalization captured in the sampled digital audio data, using the plurality of analysis features; and
grouping these Elements and/or Phrases into a plurality of higher-level units (hereinafter "Sections") of the vocalization.

10. The method of claim 9, further comprising extracting a plurality of features for each Sections, the plurality of Sections analysis features comprising one or more of:
Sections start and end points;
Sections length;
number of Elements and/or Phrases contained within;
Section pitch profiles from a plurality of profile types comprising one or more of rising, falling, steady, up/down, and variable;
Section rhythm profile chosen from a plurality of rhythm profiles comprising one or more of steady, uneven, and variable lowest frequency, highest frequency, and frequency span;
the interval from the Section to a next Section;
Section interval coefficient;
Section quality based on the qualities of the component Elements and/or Phrases using a plurality of defined qualities comprising one or more of clear, buzz, partly buzz, complex, partly complex, noise, partly noise; and
Section speed and speed category from a plurality of speed categories comprising one or more of countable and trill.

11. The method of claim 10, further comprising:
detecting repeated Elements in the vocalization captured in the sampled digital audio data, using the plurality of Element analysis features; and
grouping Elements into a plurality of higher-level units (herein referred to as "Sections") of the vocalization.

12. The method of claim 11, wherein start and end times of each Section are extracted based on an analysis of the Section's component Elements.

13. The method of claim 11, further comprising extracting a plurality of analysis features for the entire vocalization (hereinafter, the "Song") captured in the sampled digital audio data, the Song analysis features comprising one or more of:
Song length;
lowest frequency, highest frequency, and frequency span;
number of Sections;
Song quality based on the quality of the contained Sections, chosen from a plurality of defined qualities comprising one or more of clear, buzz, partly buzz, complex, partly complex, noise, partly noise, trill, and part trill;
pitch profile of the Song chosen from a plurality of defined qualities comprising one or more of rising, falling, steady and variable;
rhythm profile of the Song chosen from a plurality of defined qualities comprising one or more of steady, uneven and variable; and
Song type chosen from a plurality of defined types comprising one or more of variable, structured, and single call.

14. The method of claim 11, further comprising: consolidating and simplifying a plurality of defined high-level features of the sampled digital audio data to create a plurality of defined identification parameters comprising one or more of Song quality, Song length, Song pitch profile, Song volume profile, Section number, Section speed, Section and Element numbers; Section, Element, and Phrase types, and Song and Section inventory.

15. The method of claim 1, wherein the match identification process comprises matching a plurality of defined high-level features derived from the sampled digital audio data against a collection of similar defined high-level features derived from the vocalizations of a plurality of pre-identified "known" animal species in order to generate an identification of the species that generated the vocalization captured in the sampled digital audio data.

16. The method of claim 15, wherein the matching process uses a prioritized comparison order comprising one or more of the features of location, time, and date of recording; Song quality; Song pitch profile; Section count; Element and Part type; and Section speed.

17. The method of claim 15, wherein the matching process uses a weighted numerical distance that is computed between the plurality of defined high-level features derived from the sampled digital audio data and the defined high-level features derived from the vocalizations a plurality of known animal species.

18. The method of claim 15, wherein the matching process uses a rule-based expert to match the plurality of defined high-level features derived from the sampled digital audio data against a collection of defined high-level features derived from the vocalizations of a plurality of known animal species.

19. The method of claim 1, wherein the match identification process comprises, if no perfect match is found between the extracted analysis features and the similar extracted analysis features derived from vocalizations of a plurality of animals, generating a confidence parameter for the identification based on the number and priority of matched parameters of the closest matching species; and wherein the storing/reporting process comprises storing or reporting the confidence parameter.

20. The method of claim 1, wherein the match identification process comprises, if no perfect match is found between the extracted analysis features and the similar extracted analysis features derived from vocalizations of a plurality of animals, generating a confidence parameter for the identification based on the number and priority of matched parameters for each of one or more other possible species; and wherein the storing/reporting process comprises storing or reporting the confidence parameter.

21. An apparatus for identifying the species, appearance or other characteristics of an animal based on vocalizations, comprising:
   a processing unit configured to execute the method of claim 1 using sampled digital audio data; and
   a digital storage unit configured to store the sampled digital audio data and the output of the processing unit.

22. The apparatus of claim 21, wherein the time and location of a recording is captured by a position-locating device and provided to the processing unit for an analysis and matching process.

23. The apparatus of claim 21, further comprising a visual display, configured to display a visual representation of the sampled digital audio data on the visual display in a waveform, oscillogram, audio spectrogram, or other visual representation, and to highlight a vocalization that is contained in a longer digital audio buffer for analysis.

24. The apparatus of claim 21, further comprising a cellular telephone device which contains or can be connected to the other components, wherein a processor of the device executes the method of claim 1.

25. The apparatus of claim 21, further comprising a portable music storage and player device which contains or can be connected to the other components, wherein a processor of the device executes the method of claim 1.

26. The apparatus of claim 21, further comprising a portable audio recording device which contains or can be connected to the other components, wherein a processor of the device executes the method of claim 1.

27. The apparatus of claim 21, further comprising a portable video recording device which contains or can be connected to the other components, wherein a processor of the device executes the method of claim 1.

28. The apparatus of claim 21, further comprising a tablet computer device which contains or can be connected to the other components, wherein a processor of the device executes the method of claim 1.

29. The apparatus of claim 21, further comprising an interactive gaming device which contains or can be connected to the other components, wherein a processor of the device executes the method of claim 1.

30. A system for identifying the species, appearance or other characteristics of an animal based on vocalizations, the system comprising:
   a recording device;
   a networking interface connected to the recording device; and
   a storage and processing unit configured to execute the method of claim 1, which is accessed over a wide-area or local-area computer network through the networking interface.

31. A non-transitory computer readable medium encoded with processing instructions for implementing the method of claim 1 using one or more processors.

32. The apparatus of claim 21, further comprising a recording device, wherein the sampled digital audio data is recorded by the recording device.

33. The apparatus of claim 21, further comprising a data port, wherein the sampled digital audio data is supplied by an outside data source through the data port.

34. The method of claim 1, further comprising: isolating the sampled digital audio data from a larger digital audio data sequence using user input to define the data to be isolated.

35. The method of claim 1, wherein the signal analysis process also uses a windowed fast Fourier transform and spectral-band and/or harmonicity statistics on the resulting spectral data.

36. The apparatus of claim 21, wherein the digital storage unit stores one or more databases, the one or more databases comprising one or more collections of features of one or more known sources, together with an identification of the unique defining feature values of each of the known sources, and one or more collections of features of one or more unknown sources.

37. The apparatus of claim 30, wherein the storage and processing unit stores one or more databases, the one or more databases comprising one or more collections of features of one or more known sources, together with an identification of the unique defining feature values of each of the known sources, and one or more collections of features of one or more unknown sources.

38. The system of claim 30, further comprising a position-locating device configured to detect the time, date, and location of a recording made by the recording device, and to report it to the storage and processing unit.

39. The method of claim 1, further comprising:
   creating a summary of the plurality of analysis features for each Phrase that characterize course-grained time-domain and/or frequency-domain properties,
   wherein the information in the plurality of analysis features, used in the match identification, comprises the summary of the plurality of analysis features for each Phrase.

40. The method of claim 1, further comprising:
   performing further data reduction to reduce the plurality of analysis features to a subset of analysis features that best characterizes the Phrases in the sampled digital audio data,
   wherein the information in the plurality of analysis features, used in the match identification, comprises the subset of analysis features.

41. The method of claim 39, further comprising:
   performing further data reduction to reduce the summary of the plurality of analysis features to a subset of analysis features that best characterizes the Phrases in the sampled digital audio data, wherein the information in the plurality of analysis features, used in the match identification, further comprises the subset of analysis features.

42. The method of claim 1, further comprising storing or reporting results of the match in a form of names of one or more species of animals identified as potential sources of the vocalization captured in the sampled digital audio data.

43. A method for the collection of similar features derived from the vocalizations of animals of a plurality of known species, in a computer-based system, the method comprising:
 a. capturing the sound of the animal's vocalization onto a digital device as sampled digital audio data;
 b. performing signal analysis on the sampled digital audio data to extract a plurality of analysis features comprising one or more of: spectral peak, spectral centroid, spectral variety, spectral harmonicity, RMS amplitude, RMS delta, and spectral peak delta, which describe low-level time-domain and/or frequency-domain properties of the sampled digital audio data;
 c. using the plurality of analysis features to perform audio onset detection, event delineation and event grouping to determine break-points in time that describe individual time-segments or notes (hereinafter Elements), and groups of Elements (hereinafter "Phrases") of the vocalization captured in the sampled digital audio data;
 d. using the plurality of analysis features and audio onset detection/segmentation results, perform Element and Phrase analysis to extract a plurality of high-level symbolic features, the plurality of defined high level Element/Phrase features comprising one or more of:
 symbolic duration and/or inter-onset (IOI) ratio,
 symbolic loudness,
 symbolic pitch and pitch span,
 symbolic tone-color quality chosen from a plurality of defined qualities comprising one or more of noise, clear, formant, complex, and buzz,
 symbolic pitch shape and profile chosen from a plurality of defined profiles and shapes comprising one or more of steady, slur-up, slur-down, bow-up, bow-down, trill, vibrato and chaotic,
 symbolic amplitude envelope shape and profile chosen from a plurality of defined profiles and shapes, comprising one or more of steady, percussive, ADSR, swell, tremolo and chaotic, and
 symbolic time and pitch interval between the Elements and Phrases,
 e. storing the results of the analysis in a file or database for later use.

44. The method of claim 43, further comprising: processing all instances of one extracted feature for each captured vocalization of one known species to create a simplified master identification feature, using a plurality of analytic methods comprising one or more of average or mean analysis, average disregarding highest and lowest variants, and highest and lowest possible range parameters.

45. The method of claim 43, further comprising: prioritizing the list of master identification features to assign a rank to each feature, based on the uniqueness of the feature in relation to all other master identification features of known species.

46. The method of claim 43, further comprising:
 creating a summary of the plurality of analysis features for each Element or Phrase that characterize course-grained time-domain and/or frequency-domain properties,
 wherein the results of the analysis comprise the summary of the plurality of analysis features for each Element or Phrase.

47. The method of claim 43, further comprising:
 performing further data reduction to reduce the plurality of analysis features to a subset of analysis features that best characterizes the Elements or Phrases in the sampled digital audio data,
 wherein the results of the analysis comprise the subset of analysis features.

48. The method of claim 46, further comprising:
 performing further data reduction to reduce the summary of the plurality of analysis features to a subset of analysis features that best characterizes the Elements or Phrases in the sampled digital audio data,
 wherein the results of the analysis further comprise the subset of analysis features.

* * * * *